United States Patent [19]

Yamamoto et al.

[11] Patent Number: 5,162,944
[45] Date of Patent: Nov. 10, 1992

[54] OPTICAL SPACE SWITCH AND NETWORK FOR SUCH OPTICAL SPACE SWITCHES

[75] Inventors: Tsuyoshi Yamamoto, Kawasaki; Hiroyasu Itoh, Yokohama; Takakiyo Nakagami, Tokyo, all of Japan

[73] Assignee: Fujitsu Limited, Kawasaki, Japan

[21] Appl. No.: 636,642

[22] Filed: Dec. 28, 1990

[30] Foreign Application Priority Data

Dec. 28, 1989 [JP] Japan .................................. 1-338185
Jun. 22, 1990 [JP] Japan .................................. 2-162663

[51] Int. Cl.$^5$ .......................... G02F 1/01; G02B 27/28
[52] U.S. Cl. .................................... 359/247; 359/251; 359/256; 359/259; 455/616
[58] Field of Search ................ 350/380, 381, 384, 385, 350/400, 401, 403; 359/246, 247, 249, 250, 251, 256, 259; 455/616

[56] References Cited

U.S. PATENT DOCUMENTS

| | | | |
|---|---|---|---|
| 3,346,319 | 10/1967 | Billings | 350/385 |
| 3,481,661 | 12/1969 | Harris | 350/381 |
| 3,501,220 | 3/1970 | Bernal G. et al. | 350/381 |
| 3,540,794 | 11/1970 | Kosanke et al. | 350/381 |
| 3,743,378 | 7/1973 | Bousky | 350/381 |
| 3,753,608 | 8/1973 | Bernal G. | |
| 4,272,159 | 6/1981 | Matsumoto | 350/375 |
| 4,461,543 | 7/1984 | McMahon | 350/383 |
| 4,837,855 | 6/1989 | Hajikano et al. | 455/600 |

FOREIGN PATENT DOCUMENTS

0277779A1 8/1988 European Pat. Off. .
0307244A1 3/1989 European Pat. Off. .
2076994A 12/1981 United Kingdom .

OTHER PUBLICATIONS

J. Jahns et al., "Crossover networks and their optical implementation," Applied Optics, vol. 27, No. 15, Aug. 1, 1988, pp. 3155-3160.
J. E. Midwinter, "Novel approach to the design of optically activated wideband switching matrixes," IEE Proceedings, vol. 134, Pt. J, No. 5, Oct. 1987, pp. 261-268.
Uematsu et al., "Architecture of a Packet Switch Based on Banyan Switching Network with Feedback Loops," IEEE Journal of Selected Areas in Communications, vol. 6, No. 9, Dec. 1988, pp. 1521-1527.
Achille Pattavina, "Multichannel Bandwidth Allocation in a Broadband," IEEE Journal of Selected Areas in Communications, vol. 6, No. 9, Dec. 1988, pp. 1489-1499.
A. Ajisawa et al., "A Monolithically Integrated Optical Gate 2×2 Matrix Switch Using GaAs/AlGaAs Multi- (List continued on next page.)

Primary Examiner—Bruce Y. Arnold
Assistant Examiner—Martin Lerner
Attorney, Agent, or Firm—Staas & Halsey

[57] ABSTRACT

An optical space switch includes a polarization controller, a beam splitter, a first reflection block and a second reflection block. The polarization controller has a first mode and a second mode. The polarization controller maintains the polarization of input light in the first mode and changes it by 90° in the second mode. The first reflection block includes a quarter wave plate and a light path changing element. The input light from the polarization beam splitter is reflected by the first reflection block. During this time, the input light passes through the quarter wave plate twice. Thus, the polarization of the input light is changed by 90°. Further, the light path of the input light is shifted by a predetermined distance by the light path changing element. The second reflection block has a quarter wave plate and a mirror. The second reflection block receives the input light from the polarization beam splitter, and returns it thereto. During this time, since the input light passes through the quarter wave plate of the second block twice, the polarization thereof is changed by 90°. The input light is emitted from the polarization beam splitter via a first ouput path or a second output path.

53 Claims, 37 Drawing Sheets

OTHER PUBLICATIONS ple Quantum Well Structure," The 70th Anniversary of the Institute of Electronics, Information and Communication Engineers Memorial National Convention Record, S11-1, 1987, pp. 4-269-4-270.

A. Himeno et al., "Silica-Based Single-Mode Optical Waveguide Gate Matrix Switch," The 70th Anniversary of the Institute of Electronics, Information and Communication Engineers Memorial National Convention Record, S11-2, 1987, pp. 4-271-4-272.

K. Kanayama et al., "Two-Dimensional Image Switching Networks Using Liquid Crystal Optical Gates," The 70th Anniversary of the Institute of Electronics, Information and Communication Engineers Memorial National Convention Record, S11-3, 1987, pp. 4-273-4-274.

M. Yamaguchi et al., "Wavelength-Division-Multiplexing Transmission System Using PLZT Optical Shutter Array," The 70th Anniversary of the Institute of Electronics, Information and Communication Engineers Memorial National Convention Record, S11-4, 1987, pp. 4-275-4-276.

A. Himeno et al., "Frequency-Division Optical Switch," The 70th Anniversary of the Institute of Electronics, Information and Communication Engineers Memorial National Convention Record, S11-5, 1987, pp. 4-277.

N. Goto et al., "Wavelength-Multiplexed Optical Signal Processing Using Integrated Collinear Acousto-Optic Switches," The 70th Anniversary of the Institute of Electronics, Information and Communication Engineers Memorial National Convention Record, S11-6, 1987, pp. 4-278-4-279.

Y. Oikawa et al., "Study of 4×4 Optical Guided Switch for Optical Nodes," The 70th Anniversary of the Institute of Electronics, Information and Communication Engineers Memorial National Convention Record, S11-7, 1987, pp. 4-280.

T. Shimoe et al., "A Path-Independent-Insertion-Loss Optical Space Switch," The 70th Anniversary of the Institute of Electronics, Information and Communication Engineers Memorial National Convention Record, S11-8, 1987, pp. 4-281-4-282.

K. Habara et al., "Considerations on the Tree-Structured Optical Switch Matrix," The 70th Anniversary of the Institute of Electronics, Information and Communication Engineers Memorial National Convention Record, S11-9, 1987, pp. 4-283-4-284.

M. Fujiwara et al., "Application of Coherent Transmission Technologies to Photonic Switched Networks," The 70th Anniversary of the Institute of Electronics, Information and Communication Engineers Memorial National Convention Record, S11-10, 1987, pp. 4-285-4-286.

FIG.IA PRIOR ART
FIG.IB PRIOR ART
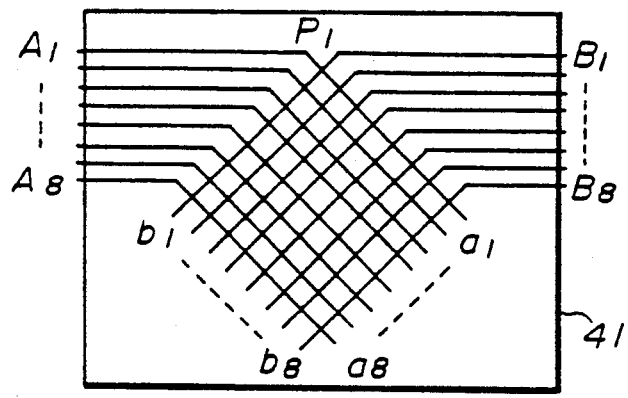
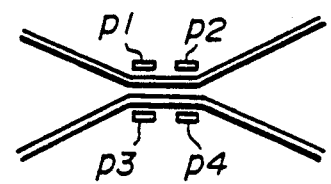
FIG.2 PRIOR ART
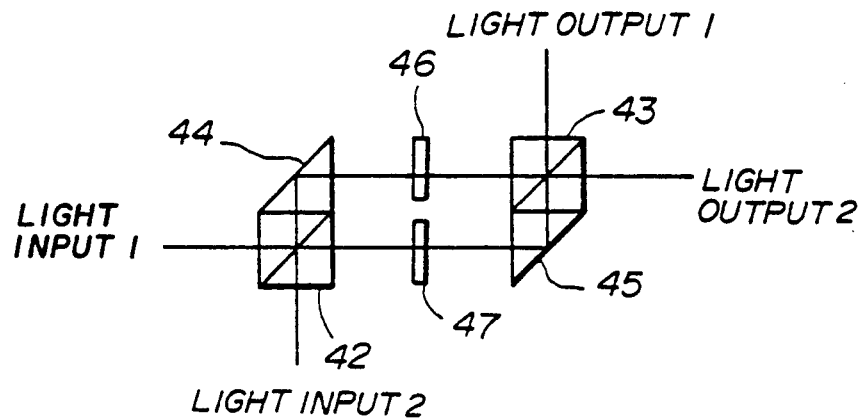
FIG.3 PRIOR ART
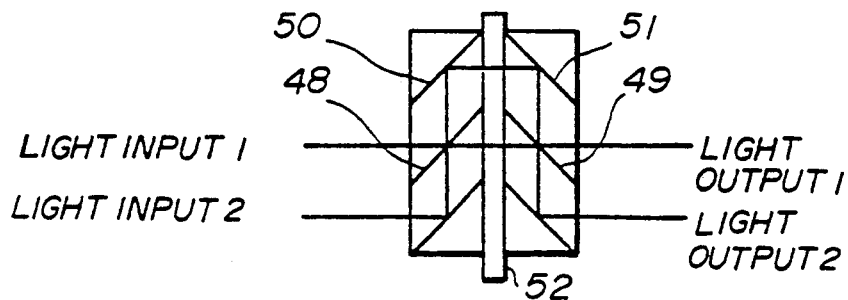

(b)

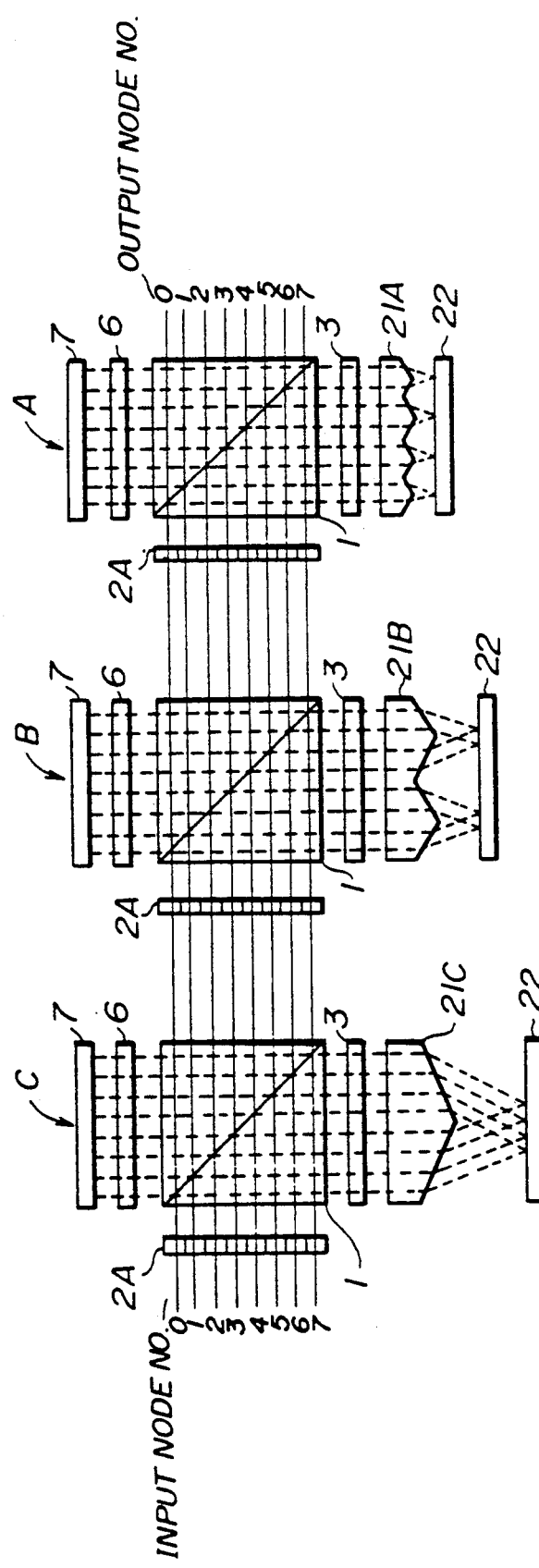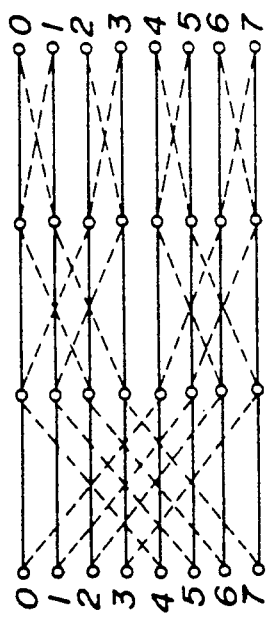
FIG.17A
FIG.17B

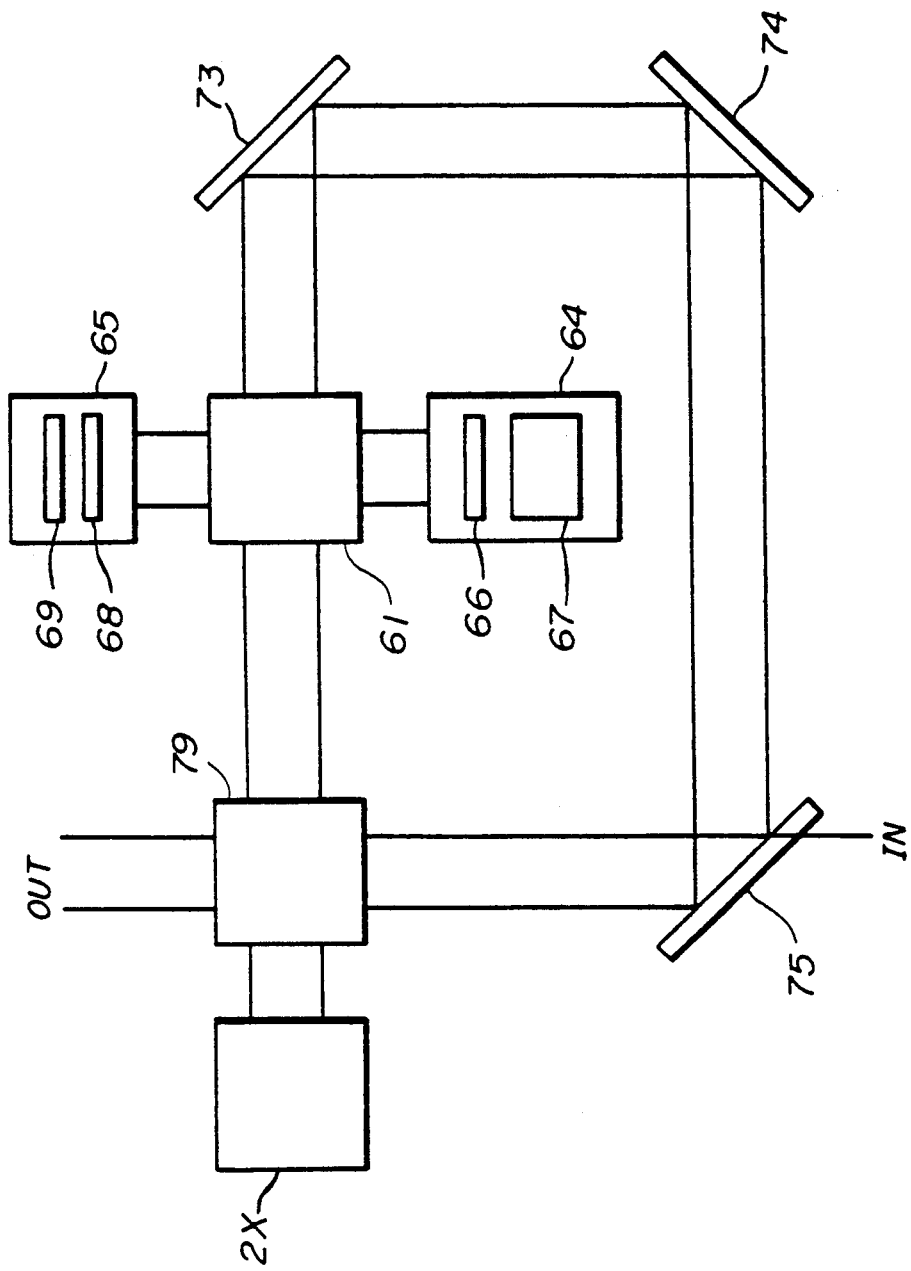

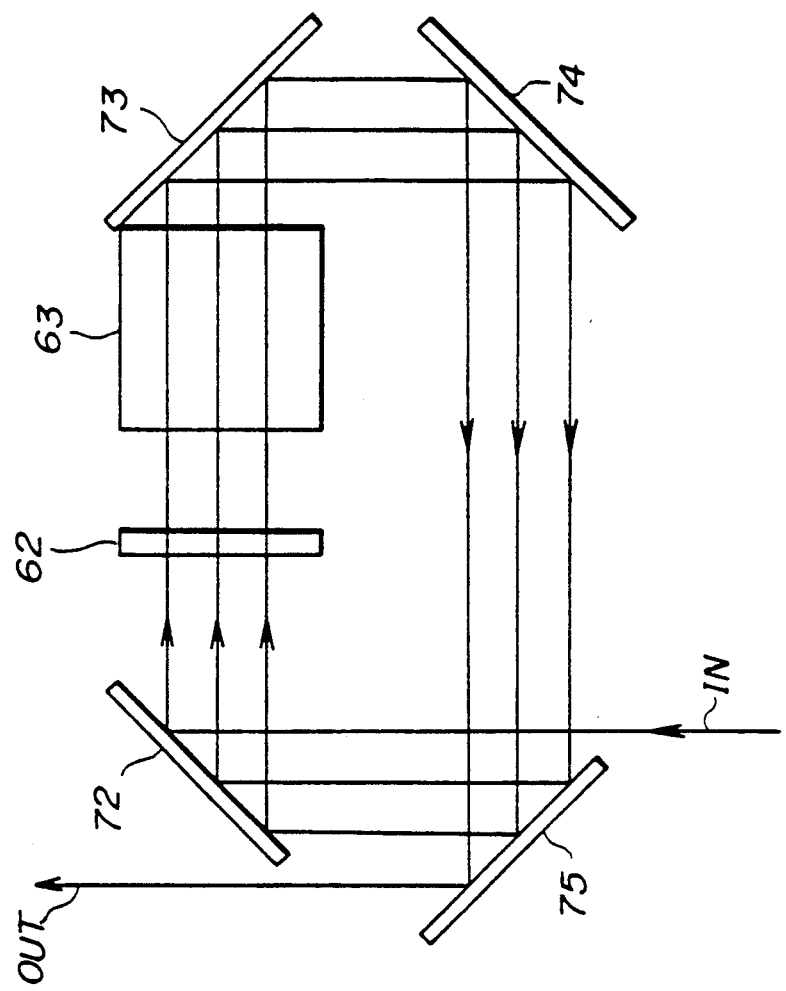

OPTICAL SPACE SWITCH AND NETWORK FOR SUCH OPTICAL SPACE SWITCHES

CROSS-REFERENCE TO RELATED APPLICATION

The subject application is related to U.S. Pat. No. 4,837,855, entitled "NON-BLOCKING OPTICAL SPACE SWITCH", by Hajikano et al., dated Jun. 6, 1989 and assigned to the common assignee herein, Fujitsu Limited.

BACKGROUND OF THE INVENTION

The present invention generally relates to optical space switches, and more particularly to an optical space switch in which switch optical signals are spatially multiplexed. Further, the present invention is concerned with a network using such optical space switches.

Optical switches are used for switching optical signals between devices such as boards, chips, waveguides, and optical fiber cables. Currently, the speed and capacity of communication and information processing is increasing. Thus, there is a need for optical switches capable of switching optical signals at high speeds and high density. Particularly, there is a need for optical space switches which are multiplexed in the one- or two-dimensional space.

Referring to FIGS. 1A and 1B, there is illustrated a conventional optical space switch. More specifically, FIG. 1A shows the entire structure of a conventional waveguide type optical space switch which has an array of crossbar switches. The optical space switch shown in FIG. 1A has a dielectric ($LiNbO_3$) substrate 41 having an electro-optical effect. Waveguides A1-A8-a1-a8, and b1-b8-B1-B8 are formed on the dielectric substrate 41. FIG. 1B shows an optical switch arranged at each cross point, at which four electrodes p1-p4 are arranged.

The electric fields resulting from the electrodes p1-p4 are controlled, so that the connection between the two waveguides can be controlled. For example, by controlling the electrical fields at a cross point P1, two light paths, one consisting of A1-a1 and b1-B1, and the other consisting of A1-B1 and b1-a1, are selectively obtained. In this manner, the light paths can be arbitrarily switched between inputs A1-A8 and outputs B1 and B8.

Referring to FIG. 2, there is illustrated another conventional optical space switch, which is composed of several optical elements. Polarization beam splitters 42 and 43, total reflection mirrors 44 and 45, and polarization controllers 46 and 47. Each of the polarization splitters 42 and 43 passes a horizontally polarized component of an input light and reflects a vertically polarized component thereof. Each of the polarization controllers 46 and 47 rotates the polarization direction of the input light by 90° when it is turned ON. A light input 1 and a light input 2 are projected onto the polarization beam splitter 42 in the mutually perpendicular directions. The polarization beam splitter 42 divides each of the light inputs 1 and 2 into a horizontal polarization component and a vertical polarization component and emits these components to two output paths in such a way that the horizontal polarization component of the light input 1 and the vertical polarization component of the light input 2 penetrate on an identical output path. When the polarization controllers 46 and 47 are OFF, the components on the two output paths pass through the polarization controllers 46 and 47, and enter the polarization beam splitter 43 so that the components on the same path are perpendicular to each other. In the polarization beam splitter 43, the two paths, or the components thereon merge together, so that light outputs 1 and 2 corresponding to the light inputs 1 and 2 respectively are emitted therefrom.

On the other hand, when the polarization controllers 46 and 47 are ON, the horizontal polarization components are converted into the vertical polarization components by the polarization controllers 46 and 47, and the vertical components are converted into the horizontal polarization components thereby. The components from the polarization controllers 46 and 47 merge together in the polarization beam splitter 43, so that the light inputs 2 and 1 corresponding to the light inputs 1 and 2 respectively are emitted therefrom. In the above-mentioned way, the light inputs 1 and 2 are spatially switched.

Referring to FIG. 3, still another conventional optical space switch which uses polarization elements is illustrated. The conventional optical space switch in FIG. 3 has polarization separating films 48 and 49, total reflection films 50 and 51, and a polarization control element 52. In the structure shown in FIG. 3, the polarization beam splitters 42 and 43, and the polarization controllers 46 and 47 shown in FIG. 2 are integrally formed. The optical space switch in FIG. 3 operates in the same way as that shown in FIG. 2.

However, the above-mentioned conventional optical space switches have the following disadvantages. The optical space switch shown in FIG. 1 can switch optical signals between only the adjacent light paths. In order to realize a complex switching, it is necessary to use a large number of stages of optical space switches. Further, the optical space switch in FIG. 1 cannot switch light inputs arranged in the two-dimensional space.

Each of the structure shown in FIGS. 2 and 3 functions as a two-input two-output optical space switch. However, it is very difficult to implement optical space switches which handle three or more light inputs.

SUMMARY OF THE INVENTION

It is a general object of the present invention to provide a novel and useful optical space switch in which the above-mentioned disadvantages are eliminated.

A more specific object of the present invention is to provide an optical space switch which can easily realize a multiple-input multiple-output optical switching network.

The above-mentioned objects of the present inventions are achieved by an optical space switch comprising:

polarization control means for receiving input light and outputting the input light so that a polarization of the input light is maintained in a first mode and is substantially changed by 90° in a second mode;

polarization beam splitter means for passing the input light through the polarization control means when the input light has a first polarization to thereby output a first polarization mode light and for reflecting the input light from polarization control means when the input light has a second polarization perpendicular to the first polarization to thereby output a second polarization mode light, the polarization control means being positioned on a first side of the polarization beam splitter means;

first reflection means, positioned on a second side of the polarization beam splitter means, for reflecting one of the first polarization mode light and the second polarization mode light so that a light path of the one of the first polarization mode light and the second polarization mode light is shifted in a plane and the polarization of the one of the first polarization mode light and the second polarization mode light is substantially changed by 90° and for outputting a first reflected light; and second reflection means, positioned on a third side of the polarization beam splitter means, for reflecting the first reflected light supplied from the first reflection means via the polarization beam splitter means so that a polarization of the first reflected light is substantially changed by 90° and for outputting a second reflected light;

wherein:

the other one of the first polarization mode light and the second polarization mode light enters the polarization beam splitter means and is output, as a first mode output beam, from a fourth side of the polarization beam splitter means;

the second reflected light from the second reflection means enters the polarization beam splitter means and is output, as a second mode output beam, from the fourth side of the polarization beam splitter means; and the first mode output beam has a light path which is different from that of the second mode output beam.

The above-mentioned objects of the present invention are also achieved by an optical space switch comprising:

polarization control means for receiving input light and outputting the input light so that a polarization of the input light is maintained in a first mode and is substantially changed by 90° in a second mode;

first polarization beam splitter means for passing the input light from the polarization control means when the input light has a first polarization to thereby output a first polarization mode light and for reflecting the input light from polarization control means when the input light has a second polarization perpendicular to the first polarization to thereby output a second polarization mode light, the polarization control means being positioned on a first side of the first polarization beam splitter means;

first reflection means, positioned on a second side of the first polarization beam splitter means, for reflecting one of the first polarization mode light and the second polarization mode light to thereby output a first reflected light;

light path changing means for shifting a light path of the first reflected light in a plane;

second reflection means for reflecting one of the first reflected light output from the light path changing means and the input light output via a third side of the first polarization beam splitter means to thereby output a second reflected light; and second polarization beam splitter means for passing one of the first reflected light from the light path changing means and the second reflected light and for reflecting the other one of the first reflected light from the light path changing means and the second reflected light, wherein:

the one of the first reflected light from the light path changing means and the second reflected light is a first light beam having a light path; and the other one of the first reflected light from the light path changing means and the second reflected light is a second light output having a light path different from that of the first mode light beam.

The aforementioned objects of the present invention are also achieved by an optical space switch comprising:

polarization control means for receiving input light and outputting the input light so that a polarization of the input light is maintained in a first mode and is substantially changed by 90° in a second mode, the polarization control means comprising an array composed of a plurality of polarization controllers;

polarization beam splitter means for passing the input light from the polarization control means when the input light has a first polarization to thereby output a first polarization mode light and for reflecting the input light from polarization control means when the input light has a second polarization perpendicular to the first polarization to thereby output a second polarization mode light, the input light from the polarization control means entering the polarization beam splitter means via a first side thereof;

first reflection means, positioned on a second side of the polarization beam splitter means, for reflecting one of the first polarization mode light and the second polarization mode light so that a light path of the one of the first polarization mode light and the second polarization mode light is shifted in a first plane and the polarization of the one of the first polarization mode light and the second polarization mode light is substantially changed by 90° and for outputting a first reflected light; and second reflection means, positioned on a third side of the polarization beam splitter means, for reflecting the first reflected light supplied from the first reflection means via the polarization beam splitter means so that a polarization of the first reflected light is substantially changed by 90° and for outputting a second reflected light;

wherein:

the other one of the first polarization mode light and the second polarization mode light enters the polarization beam splitter means and is output, as a first mode output beam, from a fourth side of the polarization beam splitter means;

the second reflected light from the second reflection means enters the polarization beam splitter means and is output, as a second mode output beam, from the fourth side of the polarization beam splitter means; and the first mode output beam has a light path which is different from that of the second mode output beam, and wherein the optical space switch further comprises light circulating means for circulating the first and second mode output beams with respect to the input light so that the first and second mode output beams are repeatedly input to the polarization beam splitter means via the polarization control means and light paths of the first and second mode output beams are shifted in a predetermined direction and for finally outputting the first and second mode output beams in a second plane in which the input light is included.

The aforementioned objects of the present invention are also achieved by an optical space switch comprising:

a first one-dimensional circularly connected type optical space switch in which light is shifted in a first plane;

a second one-dimensional circularly connected type optical space switch in which light is shifted in a second plane perpendicular to the first plane; and coupling means for optically coupling the first and second one-dimensional circularly connected type optical space switches with each other, wherein each of the first and second one-dimensional optical space switches comprises:

polarization control means for receiving input light and outputting the input light so that a polarization of the input light is maintained in a first mode and is substantially changed by 90° in a second mode, the polarization control means comprising an array composed of a plurality of polarization controllers;

polarization beam splitter means for passing the input light from the polarization control means when the input light has a first polarization to thereby output a first polarization mode light and for reflecting the input light from polarization control means when the input light has a second polarization perpendicular to the first polarization to thereby output a second polarization mode light, the input light from the polarization control means entering the polarization beam splitter means via a first side thereof;

first reflection means, positioned on a second side of the polarization beam splitter means, for reflecting one of the first polarization mode light and the second light so that a light path of the one of the first polarization mode light and the second polarization mode light is shifted and the polarization of the one of the first polarization mode light and the second polarization mode light is substantially changed by 90° and for outputting a first reflected light; and second reflection means, positioned on a third side of the polarization beam splitter means, for reflecting the first reflected light supplied from the first reflection means via the polarization beam splitter means so that a polarization of the first reflected light is substantially changed by 90° and for outputting a second reflected light;

wherein:

the other one of the first polarization mode light and the second polarization mode light enters the polarization beam splitter means and is output, as a first mode output beam, from a fourth side of the polarization beam splitter means;

the second reflected light from the second reflection means enters the polarization beam splitter means and is output, as a second mode output beam, from the fourth side of the polarization beam splitter means; and the first mode output beam has a light path which is different from that of the second mode output beam, wherein:

the optical space switch further comprises light circulating means for circulating the first and second mode output beams with respect to the input light so that the first and second mode output beams are repeatedly input to the polarization beam splitter means via the polarization control means and light paths of the first and second mode output beams are shifted in a predetermined direction and for finally outputting the first and second mode output beams in a corresponding one of the first and second planes in which the input light is included; and the first and second mode output beam related to the first one-dimensional circularly connected type optical space switch pass through the coupler and are input, as the input light, to the second one-dimensional circularly connected type optical space switch.

Another object of the present invention is to provide an optical network using optical space switches as mentioned above.

This object of the present invention is achieved by an optical network comprising:

n (n is an integer equal to or larger than 2) optical space switches which are cascaded;

each of the n optical space switches comprising:

polarization control means for receiving input light and outputting the input light so that a polarization of the input light is maintained in a first mode and is substantially changed by 90° in a second mode, the polarization control means comprising an array of a plurality of polarization collectors arranged into a line, the input light having a plurality of light inputs respectively related to the polarization controllers;

polarization beam splitter means for passing the input light from the polarization control means when the input light has a first polarization to thereby output a first polarization mode light and for reflecting the input light from polarization control means when the input light has a second polarization perpendicular to the first polarization to thereby output a second polarization mode light, the polarization control means being positioned on a first side of the polarization beam splitter means;

first reflection means, positioned on a second side of the polarization beam splitter means, for reflecting one of the first polarization mode light and the second polarization mode light so that a light path of the one of the first polarization mode light and the second polarization mode light is shifted in a plane and the polarization of the one of the first polarization mode light and the second polarization mode light is substantially changed by 90° and for outputting a first reflected light; and second reflection means, positioned on a third side of the polarization beam splitter means, for reflecting the first reflected light supplied from the first reflection means via the polarization beam splitter means so that a polarization of the first reflected light is substantially changed by 90° and for outputting a second reflected light;

wherein:

the other one of the first polarization mode light and the second polarization mode light enters the polarization beam splitter means and is output, as a first mode output beam, from a fourth side of the polarization beam splitter means;

the second reflected light from the second reflection means enters the polarization beam splitter means and is output, as a second mode output beam, from the fourth side of the polarization beam splitter means;

the first mode output beam has a light path which is different from that of the second mode output beam; and the first mode output beam and the second mode output beams related to an i-th optical space switch (i=2, 3, ..., n) are supplied, as the input light, to the (n+1)th optical space switch.

BRIEF DESCRIPTION OF THE DRAWINGS

Other objects, features and advantages of the present invention will become more apparent from the following detailed description when read in conjunction with the accompanying drawings, in which:

FIGS. 1A, 1B, 2 and 3 are diagrams illustrating conventional optical space switches;

FIGS. 17A and 17B are diagrams illustrating an optical Banyan network according to a fourth preferred embodiment of the present invention;

FIG. 21B is a block diagram of a variation of the circular multi-stage type optical space switch shown in FIG. 21A;

FIG. 23 is a diagram illustrating the basic structure of a circular multi-stage optical space switch;

DESCRIPTION OF THE PREFERRED EMBODIMENTS

Figure 4A:
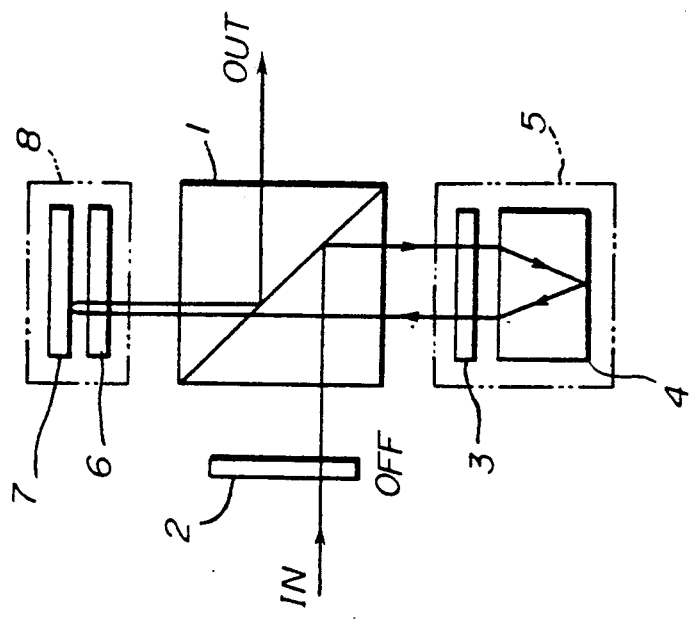
FIGS. 4A, 4B and 4C are diagrams illustrating an optical space switch according to a first preferred embodiment of the present invention.
Figure 4B:
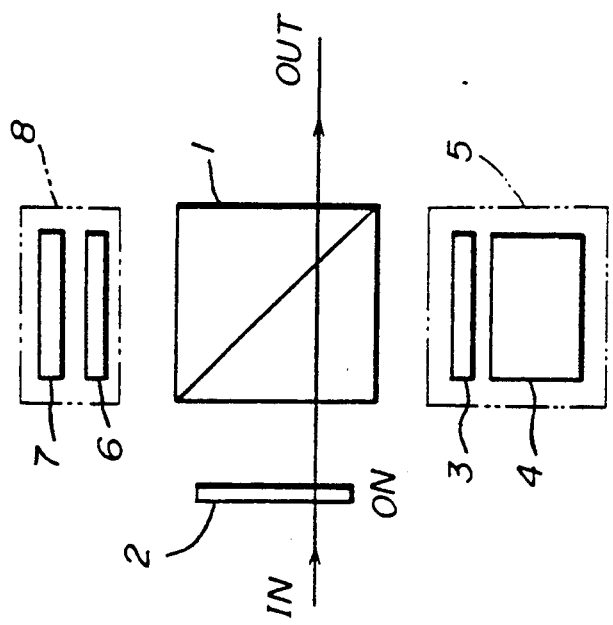
Figure 4C:
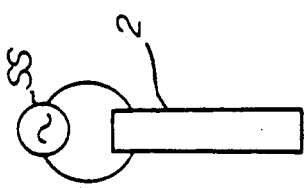

Referring to FIGS. 4A, 4B and 4C, there are illustrated an optical space switch according to a first preferred embodiment of the present invention. The optical space switch in these figures has a polarization beam splitter 1, a polarization controller 2, a first reflection block 5 and a second reflection block 8. The first reflection block 5 is positioned on a reflection side of the polarization beam splitter 1 or a side opposite to the reflection side. In the arrangement shown in FIG. 4A, the first reflection block 5 is positioned on the reflection side. The second reflection block 8 is positioned on the side of the polarization beam splitter 1 opposite to the side thereof on which the first reflection block 5 is positioned.

The polarization beam splitter 1 passes a first mode light and reflects a second mode light perpendicular to the first mode light. The polarization controller 2 is arranged on an input side of the polarization beam splitter 1, and passes an input light IN so that the polarization direction thereof is maintained or changed by 90°. The polarization controller 2 is formed of, for example, a conventional liquid crystal-spatial modulator. The first reflection block 5 is composed of a quarter wave plate 3, and a light path changing element 4. The optical axis of the quarter wave plate 3 is inclined at 45° with respect to the polarization direction of an incident light from the polarization beam splitter 1. An incident surface of the quarter wave plate 3 is perpendicular to the incident light. The light path changing element 4 shifts the position of the light path of its incident light on a first side of the center axis of the light path changing element 4 to a second side thereof opposite to the first side by an amount (distance) inherent in the light path changing element 4. The second reflection block 8 is composed of a quarter wave plate 6 and a reflection mirror 7. The optical axis of the quarter wave plate 6 is inclined at 45° with respect to the polarization direction of an incident light passing through the polarization beam splitter 1. An incident surface of the quarter wave plate 6 is perpendicular to the incident light.

The optical space switch shown in FIGS. 4A through 4C has a bypass mode and an exchange mode. As shown in FIG. 4C, a signal source SS is connected to the polarization controller 2 via electrodes (not shown), so that it is turned ON or OFF. It is now assumed that the input light is a light of the vertical polarization. As shown in FIG. 4A, when the polarization controller 2 is ON, it changes the polarization from the vertical direction to the horizontal direction. The light having the horizontal polarization passing through the polarization controller 2 passes straight through the polarization beam splitter 1 and is emitted via a side thereof opposite to the aforementioned input side, as an output light OUT.

On the other hand, when the polarization controller 2 is OFF, it passes the input light IN having the vertical polarization so that the polarization thereof is maintained. The light from the polarization controller 2 is reflected by the polarization beam splitter 1 and enters the first reflection block 5. Since the reflected light from the polarization beam splitter 1 passes through the quarter wave plate 3. Twice, the vertical polarization of the above reflected light is changed to the horizontal polarization, and output to the polarization beam splitter 1. Further, the position of the light path of the light entering the light path changing element 4 on the aforementioned first side of the center axis thereof is shifted to the second side thereof. Since the light from the first reflection block 5 has the horizontal polarization, it passes straight through the polarization beam splitter 1 and enters the second reflection block 8. The light entering the second reflection block 8 passes through the quarter wave plate 6 twice, and is thus changed to light having the vertical polarization. The light from the second reflection block 8 enters the polarization beam splitter 1 and is reflected thereby, so that the output light OUT is obtained. It should be noted that the position (light path) of the output light OUT shown in FIG. 4A is different from that of the output light OUT shown in FIG. 4B.

Figure 5A:
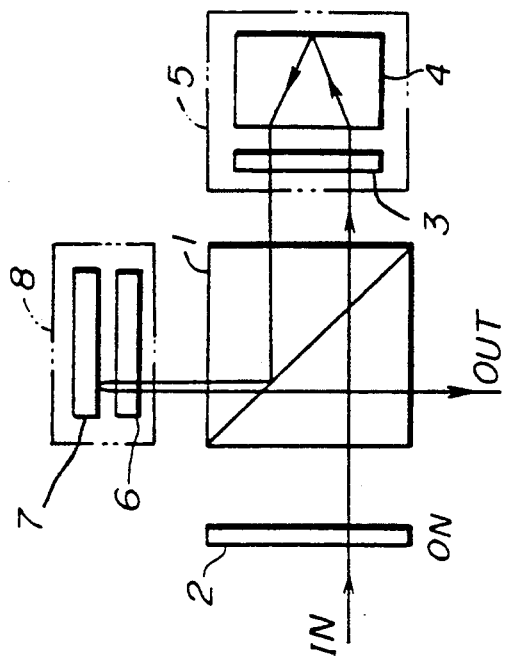
FIGS. 5A and 5B are diagrams illustrating a first variation of the first embodiment of the present invention shown in FIGS. 4A and 4B.
Figure 5B:
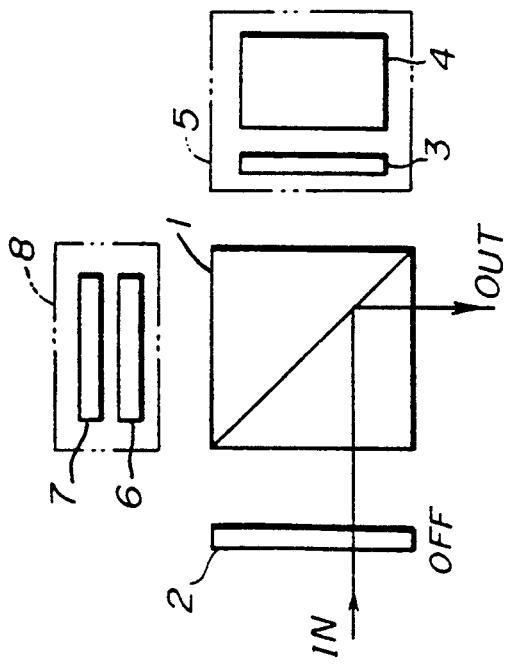

Referring to FIGS. 5A and 5B, there is illustrated a first variation of the arrangement shown in FIGS. 4A through 4C. In FIGS. 5A and 5B, those parts which are the same as those shown in FIGS. 4A through 4C are given the same reference numerals, and the signal source S shown in FIG. 4C is omitted for the sake of simplicity. The variation in FIGS. 5A and 5B is also composed of the polarization beam splitter 1, the polarization controller 2, the first reflection block 5 and the second reflection block 8. The first reflection block 5 is positioned on a side of the polarization beam splitter 1 opposite to the side thereof on which the polarization controller 2 is positioned. That is, the first reflection block 5 receives the light passing straight through the polarization beam splitter 1. The second reflection block 8 is positioned on the side of the polarization beam splitter 8 opposite to the side thereof on which the light reflected by the polarization beam splitter 1 is obtained. It is also possible to interchange the first and second reflection blocks 5 and 8 with each other.

As shown in FIG. 5A, when the polarization controller 2 is OFF, the input light IN having the vertical polarization passes through the polarization controller 2, and is then reflected by the polarization beam splitter 1, so that the output light OUT is output therefrom. On the other hand, as shown in FIG. 5B, when the polarization controller 2 is ON, the polarization of the input light IN is changed from the vertical direction to the horizontal direction. Thus, the light from the polarization controller 2 passes straight through the polarization beam splitter 1, and enters the first reflection block 5. Then, the light passes through the quarter wave plate 3 of the first reflection block 5 twice. Thus, the polarization of the light is changed from the horizontal direction to the vertical direction. Further, since the light is reflected by the light path changing element 4, the light path of the light passing through the first reflection block 5 is shifted from the first side of the center axis of the light path changing element 4 to the second side thereof. Since the light from the first reflection block 5 has the vertical direction, it is reflected by the polarization beam splitter 1 and enters the second reflection block 8. The light passes through the quarter wave plate 6 of the second reflection block 8 twice. Thus, the polarization is changed to the horizontal direction, and passes straight through the polarization beam splitter 1, so that the output light OUT is obtained. It will be noted that the light path of the output light OUT shown in FIG. 5A is different from that of the output light OUT shown in FIG. 5B.

Figure 6A:
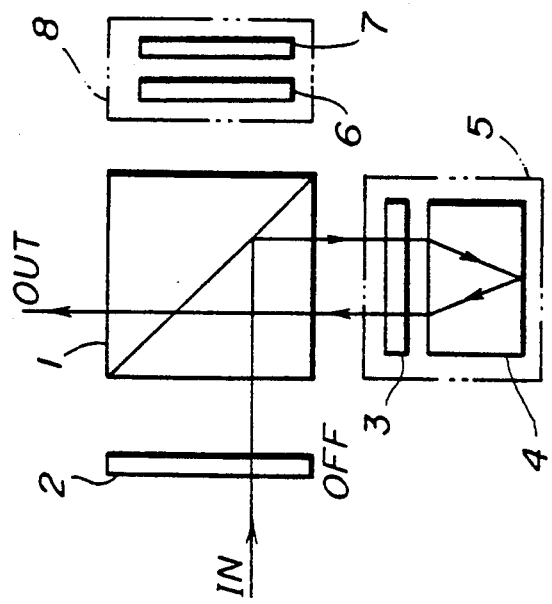
FIGS. 6A and 6B are diagrams illustrating a second variation of the first embodiment of the present invention shown in FIGS. 4A and 4B.
Figure 6B:
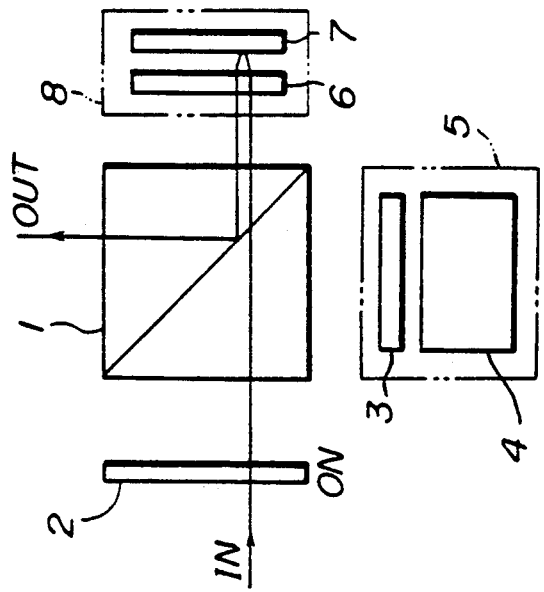

Referring to FIGS. 6A and 6B, there is illustrated a second variation of the first embodiment of the present invention. In FIGS. 6A and 6B, those parts which are the same as those shown in the previous figures are given the same reference numerals, and the signal source SS shown in FIG. 4C is omitted for the sake of simplicity. The optical space switch shown in FIGS. 6A and 6B is composed of the polarization beam splitter 1, the polarization controller 2, the first reflection block 5 and the second reflection block 8. The first reflection block 5 is positioned on the side of the polarization beam splitter 1 on which the input light IN reflected by the polarization beam splitter 1 is obtained. The second reflection block 8 is positioned on the side of the polarization beam splitter 1 on which the input light IN passing straight through the polarization beam splitter 1 is obtained.

As shown in FIG. 6A, when the polarization controller 2 is ON, the polarization of the input light IN is changed from the vertical direction to the horizontal direction, and the light from the polarization controller 2 passes straight through the polarization beam splitter 1 and then enters the second reflection block 8. Then, the light is reflected by the second reflection block 8 and further reflected by the polarization beam splitter 1, so that the output light OUT is obtained on the side of the polarization beam splitter 1 opposite to the side thereof on which the first reflection block 5 is positioned.

On the other hand, as shown in FIG. 6B, when the polarization controller 2 is OFF, the input light IN passes through the polarization controller 2 with its polarization maintained, and enters the first reflection block 5. The light is then reflected by the first reflection block 5 and passes straight through the polarization beam splitter 1, so that the output light OUT is obtained. The light path is shifted in the light path changing element 4, and thus, the light path of the output light OUT shown in FIG. 6A is different from that of the output light OUT shown in FIG. 6B.

Figure 7A:
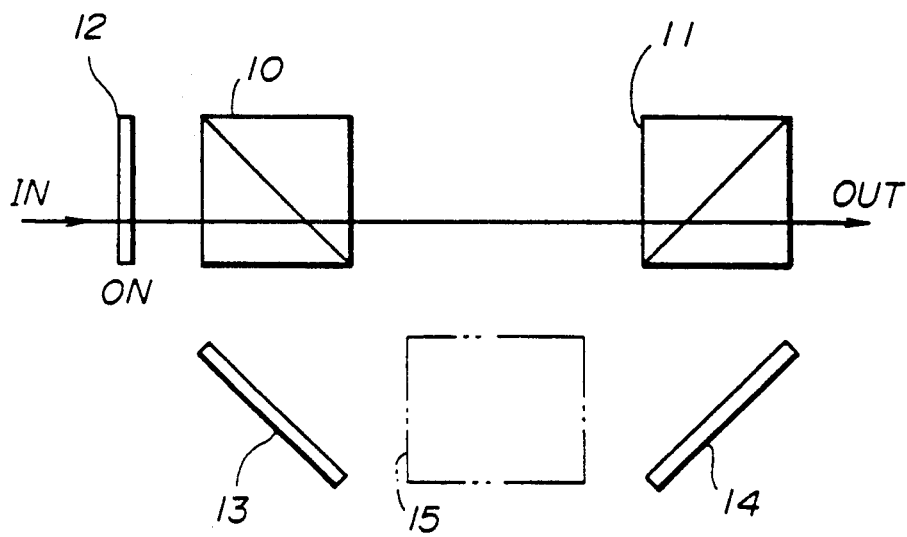
FIGS. 7A and 7B are diagrams illustrating an optical space switch according to a second preferred embodiment of the present invention.
Figure 7B:
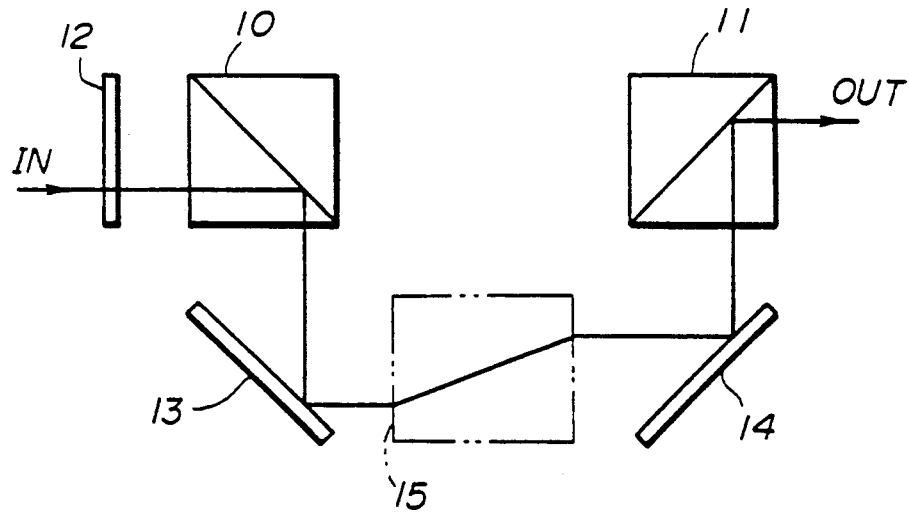

A description will now be given of an optical space switch according to a second preferred embodiment of the present invention with reference to FIGS. 7A and 7B. The optical space switch in FIGS. 7A and 7B is composed of a first polarization beam splitter 10, a second polarization beam splitter 11, a polarization controller 12 to which a signal source (not shown for the sake of simplicity) is connected, a first reflection mirror 13, a second reflection mirror 14 and a light path changing element 15. Each of the first and second polarization beam splitters 10 and 11 passes straight through light having the horizontal polarization, and reflects light having the vertical polarization. The polarization controller 12 is positioned on the input light side of the first polarization beam splitter 10. The second polarization beam splitter 11 is positioned on the light path of the light passing straight through the first polarization beam splitter 10 in such a way that a reflection surface of the second polarization beam splitter 11 is perpendicular to that of the first polarization beam splitter 10. The first reflection mirror 13 is positioned on the reflection side of the first polarization beam splitter 10 on which light reflected thereby is obtained. The second reflection mirror 14 is positioned so that light reflected by the first reflection mirror 13 goes toward the second polarization beam splitter 11. The light path changing element 15 is interposed between the first and second reflection mirrors 13 and 14. The light path changing element 15 changes the light path from a first side of the center axis thereof to a second side thereof by an amount (distance) inherent in the light path changing element 15. The light path of light from the light path changing element 15 is shifted from that of the light entering it in the direction perpendicular to these light paths.

The optical space switch shown in FIGS. 7A and 7B has the bypass mode and the exchange mode in the same way as the aforementioned first embodiment of the present invention. As shown in FIG. 7A, when the polarization controller 12 is ON, the input light IN having the vertical polarization is changed into light having the horizontal polarization. The light from the polarization controller 12 passes straight through the first and second polarization beam splitters 10 and 11, so that an output light OUT is obtained.

On the other hand, as shown in FIG. 7B, when the polarization controller 12 is OFF, the input light IN passes through the polarization controller 12 and is reflected by the first polarization beam splitter 10. Then, the reflected light from the first polarization beam splitter 10 is reflected by the first reflection mirror 13 and enters the light path changing element 15. The light path is shifted by the light path changing element 15 by an amount (distance) inherent therein. Then, the light is reflected by the second reflection mirror 14 and enters the second polarization beam splitter 11. Since the light reflected by the second reflection mirror 14 has the vertical polarization, it is reflected by the second polarization beam splitter 11, so that the output light OUT is obtained. It will be noted that the light path of the output light OUT shown in FIG. 7A is different from that of the output light OUT shown in FIG. 7B.

Figure 8A:
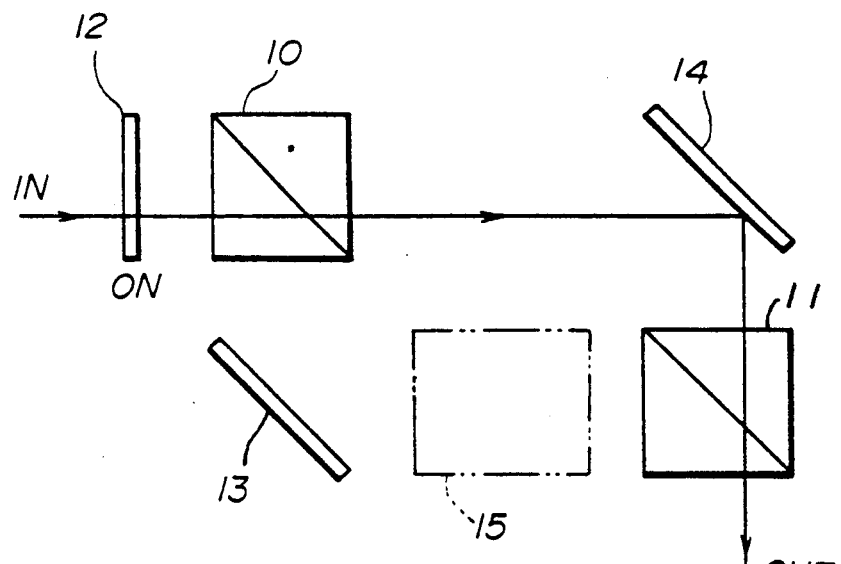
FIGS. 8A and 8B are diagrams illustrating a variation of the second preferred embodiment of the present invention.
Figure 8B:
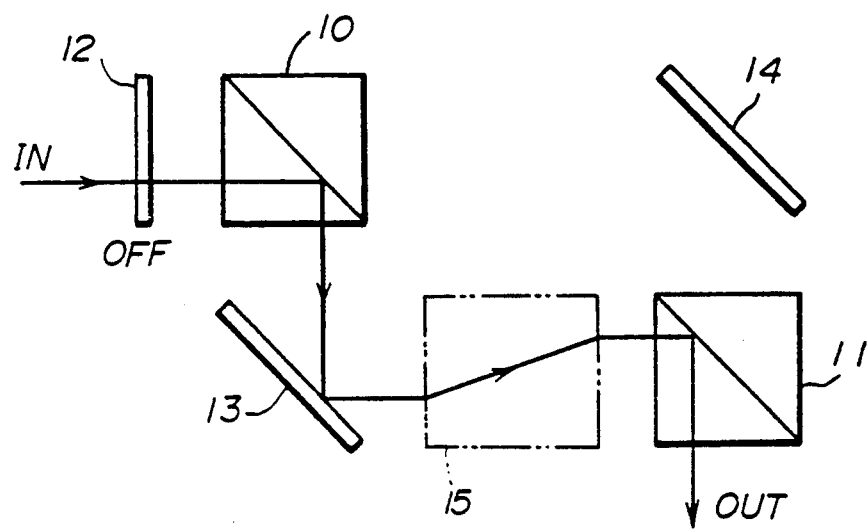

Referring to FIGS. 8A and 8B, there is illustrated a variation of the second embodiment of the present invention. In FIGS. 8A and 8B, those parts which are the same as those shown in FIGS. 7A and 7B are given the same reference numerals. The arrangement shown in FIGS. 8A and 8B is obtained by interchanging the positions of the second reflection mirror 14 and the second polarization beam splitter 11 shown in FIGS. 7A and 7B with each other. More specifically, the second reflection mirror 14 is positioned so that it reflects the light passing straight through the first polarization beam splitter 10. The second polarization beam splitter 11 is positioned so that it receives the reflected light from the second reflection mirror 14. The light path changing element 15 is interposed between the first reflection mirror 13 and the second polarization beam splitter 11.

As shown in FIG. 8A, when the polarization controller 12 is ON, the polarization of the input light IN is changed from the vertical direction to the horizontal direction. The light from the polarization controller 12 passes straight through the first polarization beam splitter 10 and is then reflected by the second reflection mirror 14. The reflected light passes straight through the second polarization beam splitter 11, so that an output light OUT is obtained.

On the other hand, as shown in FIG. 8B, when the polarization controller 12 is OFF, the input light IN having the vertical polarization is reflected by the first polarization beam splitter 10, and is then reflected by the first reflection mirror 13. The reflected light is shifted by the light path changing element 15, as shown in FIG. 8B, and then enters the second polarization beam splitter 11. Then, the light is reflected by the second polarization beam splitter 11, so that an output light OUT is obtained. It will be noted that the light path of the output light OUT shown in FIG. 8A is different from that of the output light OUT shown in FIG. 8B.

In the above-mentioned embodiments of the present invention and variations thereof, it is possible to use input light having the horizontal polarization.

Figure 9A:
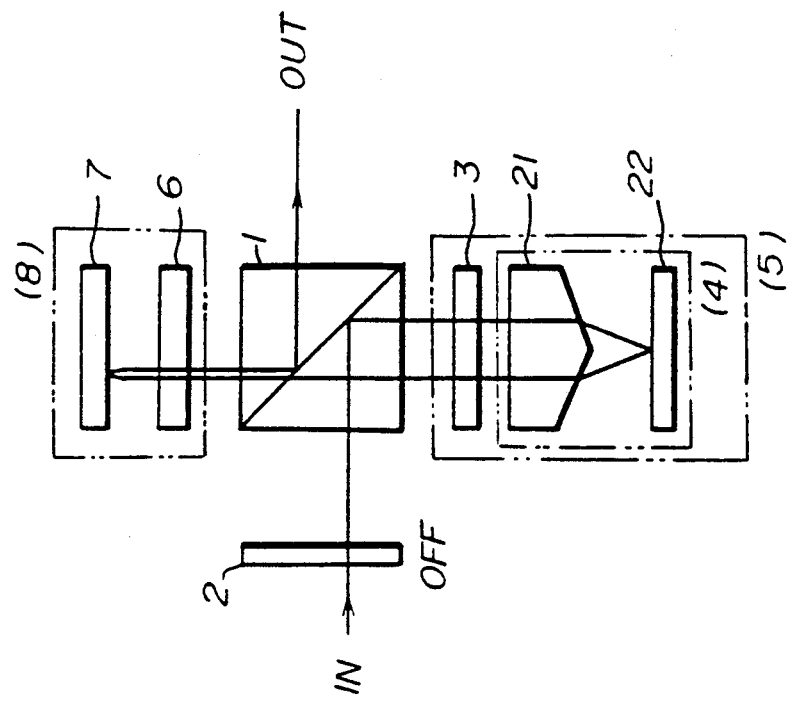
FIGS. 9A and 9B are diagrams illustrating the structure shown in FIGS. 4A and 4B in more detail.
Figure 9B:
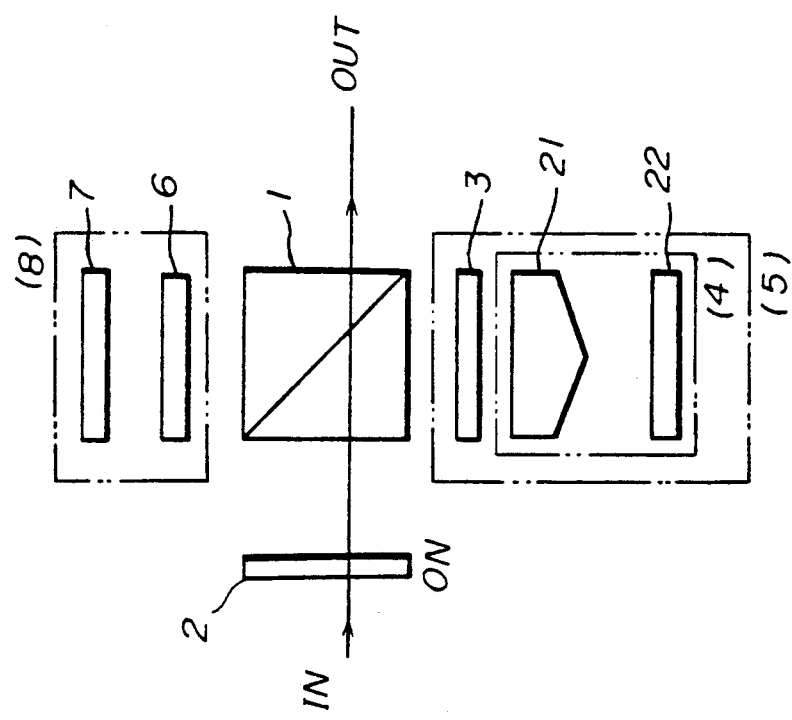

FIGS. 9A and 9B show the optical space switch shown in FIGS. 4A and 4B in more detail. The first reflection block 5 is positioned on the reflection side of the polarization beam splitter 1, and the second reflection block 8 is positioned on the side thereof opposite to the reflection side. The quarter wave plate 3 of the first reflection block 5 is positioned so that its optical axis is inclined at an angle of 45° with respect to the polarization direction of the input light. The light path changing element 4 is composed of a prism 21 and a reflection mirror 22. The prism 21 is formed of a triangle shape (pole) having a cross section of an isosceles triangle, or a combination of such a triangle pole and a square parallelepiped. Two slopes of the prism 21 faces the reflection mirrors 22.

When the polarization controller 2 is ON, the input light IN having the vertical polarization passes straight through the polarization beam splitter 1, so that the output light OUT is obtained. It will be noted that the polarization of the input beam IN is changed to the horizontal direction by the polarization controller 2. On the other hand, when the polarization controller 2 is OFF, the polarization of the input light IN is maintained. Then, the light from the polarization controller 2 is reflected by the polarization beam splitter 1, and enters the first reflection block 5. The light passes through the quarter wave plate 3 and is shifted by the prism 21. Then, the light is reflected by the reflection mirror 22 and shifted by the prism 21. After that, the light passes straight through the quarter wave plate 3 and the polarization beam splitter 1. Since the light passes through the quarter wave plate 3 twice, the polarization of the light is changed from the vertical direction to the horizontal direction. The light is reflected by the second reflection block 8 and goes back on the same light path. Then the light is further reflected by the polarization beam splitter 1, so that the output light OUT is obtained. It will be noted that the light path of the output light OUT shown in FIG. 9A is different from that of the output light OUT shown in FIG. 9B.

Figure 10B:
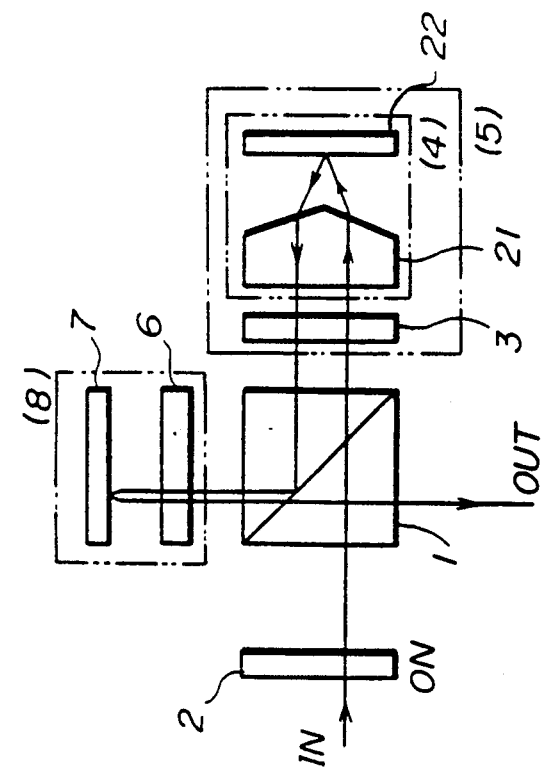
FIGS. 10A and 10B are diagrams illustrating the structure shown in FIGS. 5A and 5B in more detail.
Figure 10A:
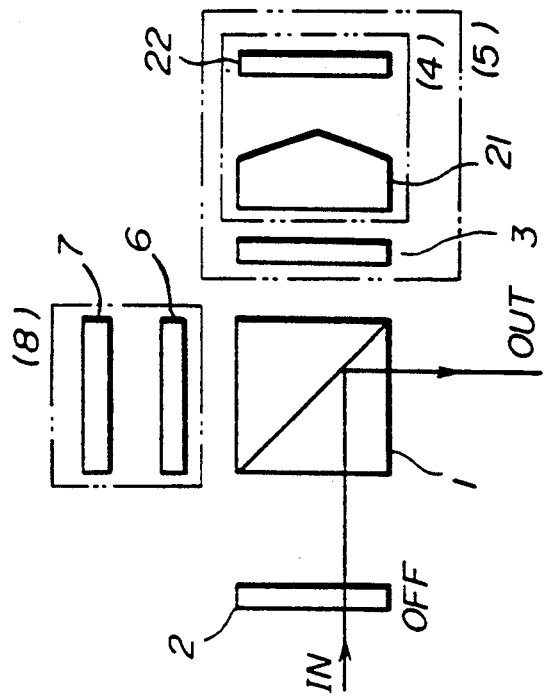

FIGS. 10A and 10B show the arrangement shown in FIGS. 5A and 5B in more detail. The first reflection block 5 composed of the quarter wave plate 3, the prism 21 and the reflection mirror 22 is positioned on the side of the polarization beam splitter 1 opposite to the side thereof on which the polarization controller 2 is positioned. The output lights OUT having the different light paths go downward in FIGS. 10A and 10B. That is, the moving direction of the output lights OUT is perpendicular to that of the input light IN. When the polarization controller 2 is OFF, the output light OUT is obtained, as shown in FIG. 10A. On the other hand, when the polarization controller 2 is ON, the output light is obtained, as shown in FIG. 10B.

Figure 11A:
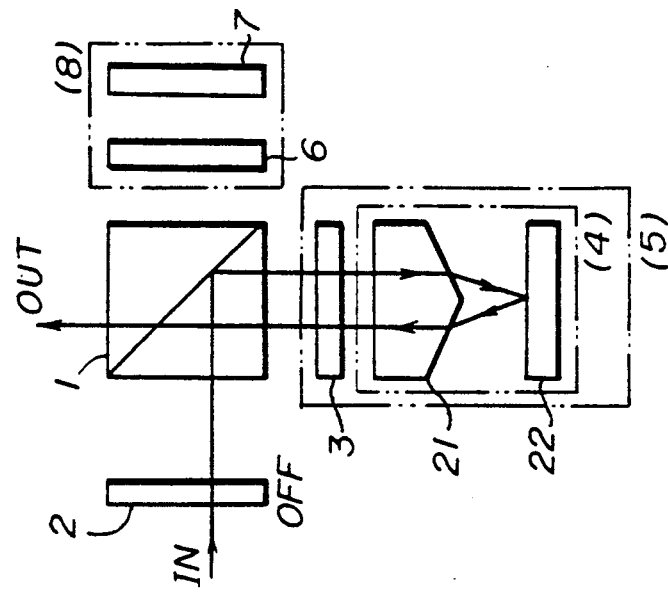
FIGS. 11A and 11B are diagrams illustrating the structure shown in FIGS. 6A and 6B in more detail.
Figure 11B:
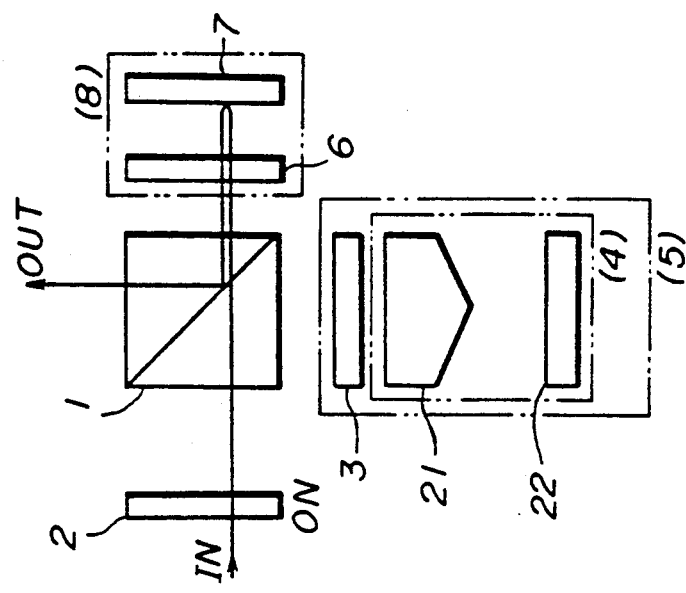

FIGS. 11A and 11B show the arrangement shown in FIGS. 6A and 6B in more detail. The first reflection block 5 is positioned on the reflection side of the polarization beam splitter 1, and the second reflection block 8 is positioned on the side of the polarization beam splitter 1 opposite to the side thereof on which the polarization controller 2 is positioned. When the polarization controller 2 is ON, the output light OUT is obtained, as shown in FIG. 11A. On the other hand, when the polarization controller 2 is OFF, the output light OUT is obtained, as shown in FIG. 11B. It will be noted that the light path of the output light OUT shown in FIG. 11A is different from that of the output light OUT shown in FIG. 11B.

The prisms 21 serving as the light path changing elements shown in FIGS. 9A through 11B may be replaced by other elements. FIGS. 12A through 12D illustrate other light path changing elements. Each of the light path changing elements receive four light inputs. The four light inputs are grouped into a first group which consists of two light inputs on the left side, and a second group which consists of the other two light inputs on the right side. The light inputs on the left side are changed to light outputs of the right side, and the light inputs on the right side are changed to light outputs of the left side.

Figure 12A:
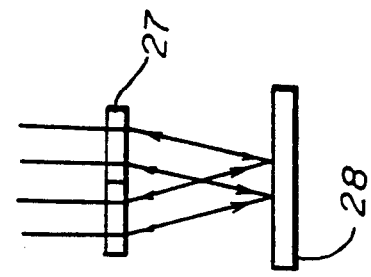
FIGS. 12A, 12B, 12C and 12D are respectively illustrating light path changing elements.
Figure 12B:
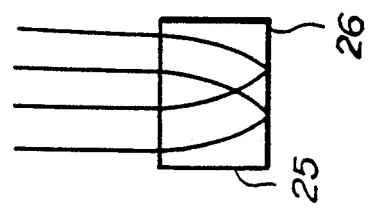
Figure 12C:
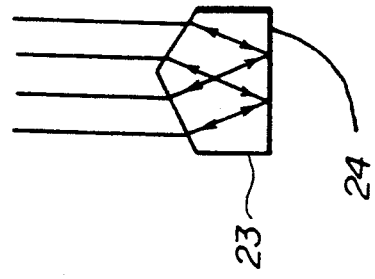
Figure 12D:
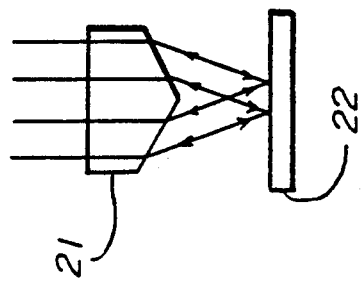

The light path changing element shown in FIG. 12A is composed of the aforementioned prism 21 and the reflection mirror 22. The light path changing element shown in FIG. 12B is formed of a prism 23 which is a combination of a triangle member (pole) having a cross section of an isosceles triangle and a rectangular parallelepiped. A reflection coating layer 24 is formed on a back surface of the rectangular parallelepiped. It will be noted that the light path changing element shown in FIG. 12B does not use a reflection mirror as shown in FIG. 12A. The light path changing element shown in FIG. 12C is formed of a square transparent graded index (GI) element of a rectangular parallelepiped having a one-dimensional symmetry distribution of refractive index in a direction in which the light path is shifted. A reflection coating layer 26 is formed on a back surface of the graded index element 25. The light path changing element shown in FIG. 12D is composed of a diffraction grating 27 and a reflection mirror 28. Since each of the above-mentioned prisms receives a plurality of light inputs in the same direction, it is possible to form an array of prisms. By using such an array of prisms together with an array of polarization controllers, it is possible to provide a multiple-input/multiple-output optical space switch.

Figure 13A:
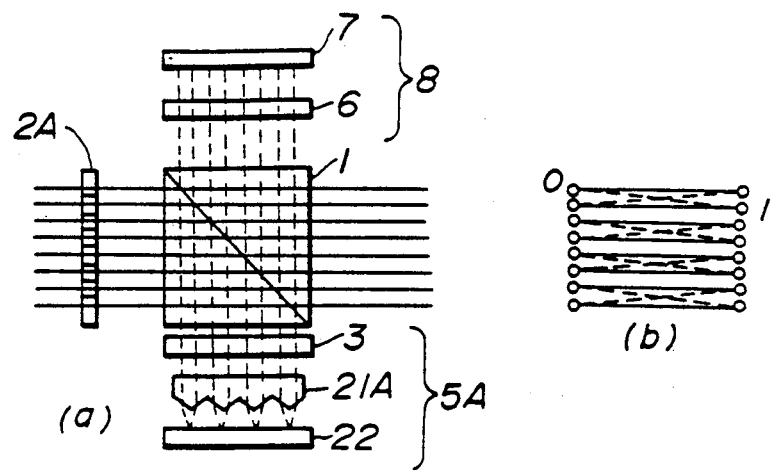
FIG. 13A is a diagram of an optical space switch according to a third preferred embodiment of the present invention.
Figure 13B:
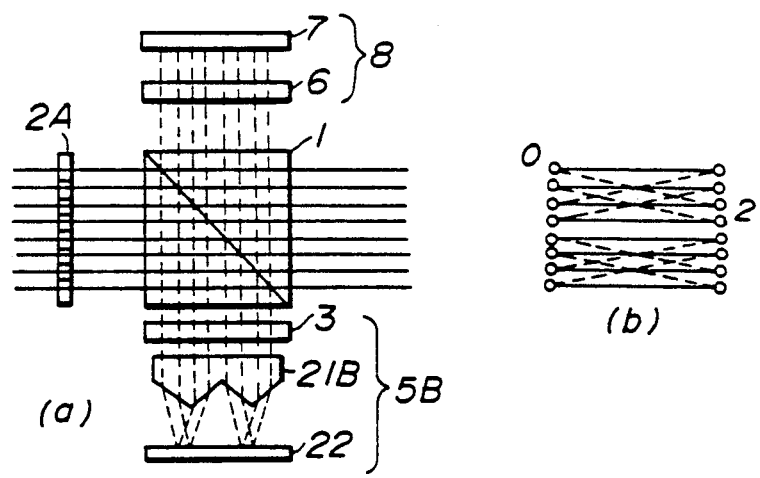
FIG. 13B is a diagram of a first variation of the third embodiment of the present invention shown in FIG. 13A.

FIG. 13A illustrates an optical space switch according to a third preferred embodiment of the present invention. The optical space switch shown in FIG. 13A-(a) is composed of a polarization beam splitter 1, a polarization controller array 2A, a first reflection block 5A, and the second reflection block 8. The polarization controller array 2A is composed of a plurality of (eight) polarization controllers aligned in a line. A signal source (not shown for the sake of simplicity) is connected to each of the polarization controllers. Eight light inputs are separately controlled by the polarization controller array 2A. The prism 21A has a plurality of (four) prism portions, each having a cross-sectional portion having an identical isosceles triangle shape. In other words, the prism 21A is like an arrangement in which four two-input/two-output prisms 21 are integrally arranged side by side. FIG. 13A-(b) is a diagram illustrating an equivalent diagram of the optical space switch shown in FIG. 13A-(a). Each of the prism portions of the prism 21A switches the two adjacent light paths. For example, the light input at input node "0" can be switched to the light output at output node "1", as shown in FIG. 13A-(b).

FIG. 13B-(a) illustrates an optical space switch in which the prism 21A shown in FIG. 13A-(a) is replaced by a prism 21B. The prism 21B has two prism portions, each having a cross-sectional portion with an identical isosceles triangle shape. Each of the two prism portions of the prism 21B functions as an four-input/four-output optical space switch. As shown in FIG. 13B-(b), the input light at input node "0" can be switched to the output light at output node "2".

Figure 13C:
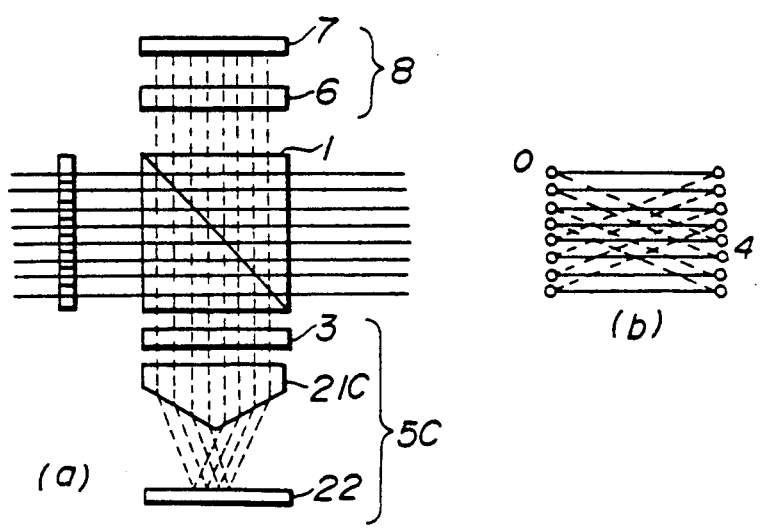
FIG. 13C is a diagram of a second variation of the third embodiment of the present invention shown in FIG. 13A.

FIG. 13C-(a) illustrates an optical space switch in which a light path changing element 5C has an eight-input/eight-output prism 21C. The prism 21C has a single prism portion having two slopes, each receiving four light inputs. As shown in FIG. 13C-(b), the input light at input node "0" can be switched to the output light at output node "4".

Figure 14A:
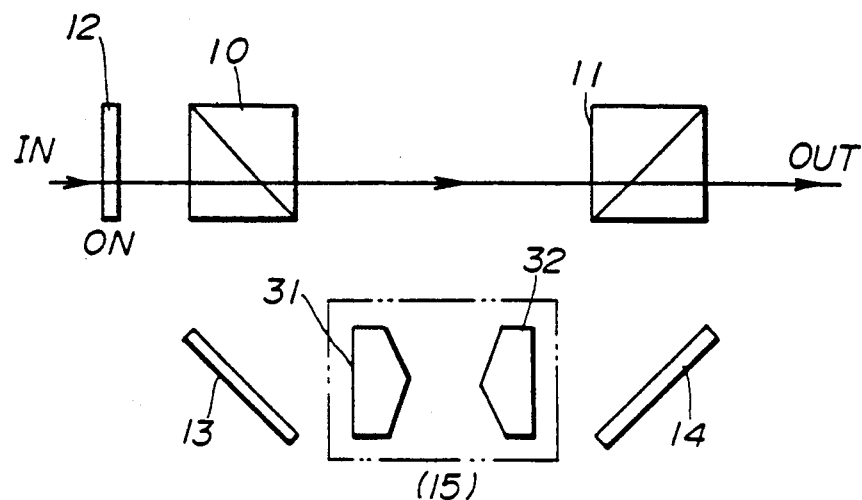
FIGS. 14A and 14B are diagrams illustrating the structure shown in FIGS. 7A and 7B in more detail.
Figure 14B:
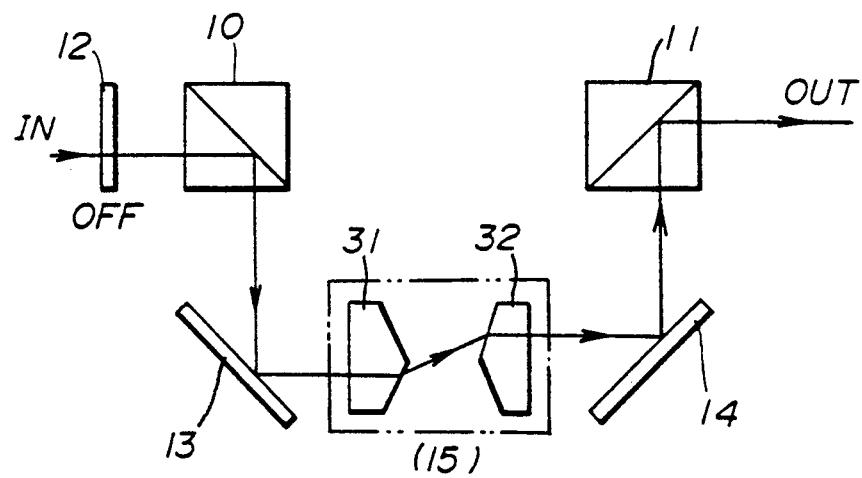

FIGS. 14A and 14B illustrate the arrangement shown in FIGS. 7A and 7B in more detail. In FIGS. 14A and 14B, those parts which are the same as those shown in FIGS. 7A and 7B are given the same reference numerals. As has been described previously, the second embodiment of the present invention does not use any quarter wave plate, but instead uses two polarization beam splitters. The light path changing element 15 is composed of two prisms 31 and 32. The inclined surfaces of the prism 31 faces those of the prism 32.

As shown in FIG. 14A, when the polarization controller 12 is ON, the polarization of the input light IN is changed to the horizontal direction. Then, the light from the polarization controller 12 passes straight through the first and second polarization beam splitters 10 and 11, so that the light output OUT is obtained. On the other hand, as shown in FIG. 14B, when the polarization controller 12 is OFF, the light input IN passes through the polarization controller 12, and is then reflected by the first polarization beam splitter 10 and the first reflection mirror 13. Then, the light enters the light path changing element 15, and is deflected due to the function of the prisms 31 and 32 shown in FIG. 14B. Then, the light is reflected by the second reflection mirror 14 and the second polarization beam splitter 11, so that the output light OUT is obtained. The light path of the output light OUT shown in FIG. 14A is different from that of the output light OUT shown in FIG. 14B.

Figure 15A:
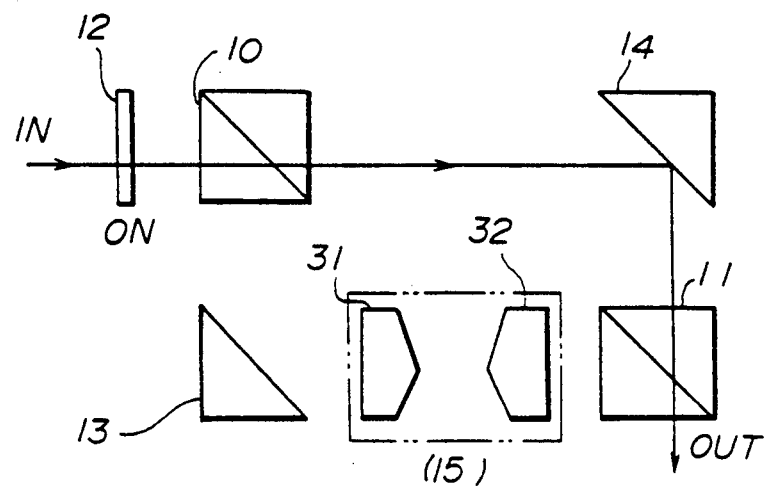
FIGS. 15A and 15B are diagrams illustrating the structure shown in FIGS. 8A and 8B in more detail.
Figure 15B:
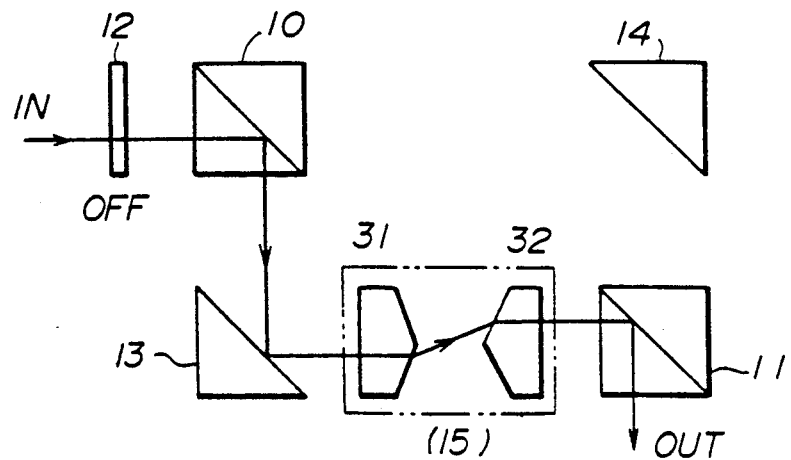

FIGS. 15A and 15B illustrate the variation of the arrangement shown in FIGS. 8A and 8B. The positions of the first polarization beam splitter 11 and the second reflection mirror 14 shown in FIGS. 14A and 14B are interchanged with each other. When the polarization controller 12 is ON, the output light OUT is obtained, as shown in FIG. 15A. On the other hand, when the polarization controller 12 is OFF, the output light OUT is obtained, as shown in FIG. 15B. The light path of the output light OUT shown in FIG. 15A is different from that of the output light OUT shown in FIG. 15B.

Figure 16B:
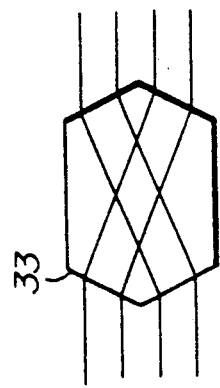
FIGS. 16A, 16B, 16C and 16D are diagrams respectively illustrating light path changing elements.
Figure 16D:
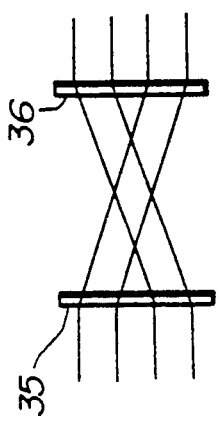
Figure 16A:
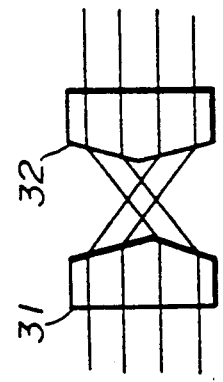
Figure 16C:
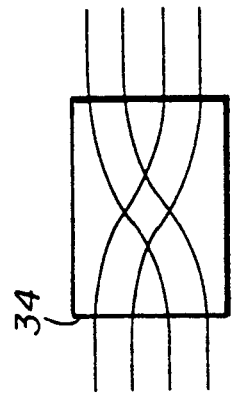

Each of the above-mentioned prisms 31 and 32, which is also shown in FIG. 16A, may be replaced by other elements shown in FIGS. 16B through 16D. FIG. 16B illustrates a prism 33 of a hexagon member (pole), which consists of two triangle members (poles) having cross sections with an identical isosceles triangle shape, and a square member (pole) having opposite surfaces on which the two triangle members are respectively mounted. The prism 33 functions in the same way as the combination of the prisms 31 and 32. FIG. 16C illustrates a graded index element 34 formed of a square transparent member (pole) having a one-dimensional symmetry distribution of refractive index in a direction in which the light path is shifted. The element 34 functions in the same way as the combination of the prisms 31 and 32. FIG. 16D shows a combination of two diffraction gratings 35 and 36 spaced apart from each other.

According to the second embodiment of the present invention and its variations, the light path changing element 15 can receive a plurality of light inputs in the same direction. Thus, it is possible to provide a multiple-input/multiple-output optical space switch which employs a polarization controller array as shown in FIG. 13A as well as an array of prisms, in a similar way to that of the arrangements shown in FIGS. 13A through 13C.

A description will now be given of a fourth preferred embodiment of the present invention with reference to FIGS. 17A and 17B. The fourth embodiment of the present invention is an optical Banyan network using the optical space switches shown in FIGS. 13A through 13C. In FIGS. 17A and 17B, those parts which are the same as those shown in FIGS. 13A through 13C are given the same reference numerals. The optical space switches (nodes) indicated by references C, B and A respectively shown in FIGS. 13C, 13B and 13A are cascaded in this order from the input side of the network. The network inputs eight light inputs and outputs eight light outputs. An equivalent network of the network shown in FIG. 17A is illustrated from FIG. 17B. This equivalent network is obtained from the equivalent networks shown in FIGS. 13A-(b), 13B-(b) and 13C-(b). The network in FIG. 17B is an optical Banyan network.

In general, when a plurality of light inputs consists of $2^n$ light inputs, the i-th optical space switch (i=1, 2, ..., n) comprises an array of $2^{i-1}$ light path changing elements arranged in a line, and $2^{n-i+1}$ light inputs among the $2^n$ light inputs are applied to each of the $2^{i-1}$ light path changing elements of the i-th optical space switch. Each of the $2^{i-1}$ light path changing elements switches light paths which are spaced apart from each other by $2^{n-i}$.

The switching operation of the network shown in FIGS. 17A and 17B is based on the following rule. That is, each of the polarization controllers of each of the polarization controller arrays 2A is controlled in accordance with this rule. An exclusive-OR operation on an input node number in binary notation and an output node number in binary notation is calculated. The bit which is one bit higher than the most significant bit of the result of the exclusive-OR operation is set to 1. Then, the exclusive-OR operation on the adjacent bits is calculated. When the result of this exclusive-OR operation is equal to 1, the corresponding polarization controller is ON. On the other hand, when the result of the exclusive-OR operation is equal to 0, the corresponding polarization controller is OFF. Such an ON/OFF control is sequentially carried out by tracing each light path from the most significant bit from the node of the first stage.

Figure 17C:
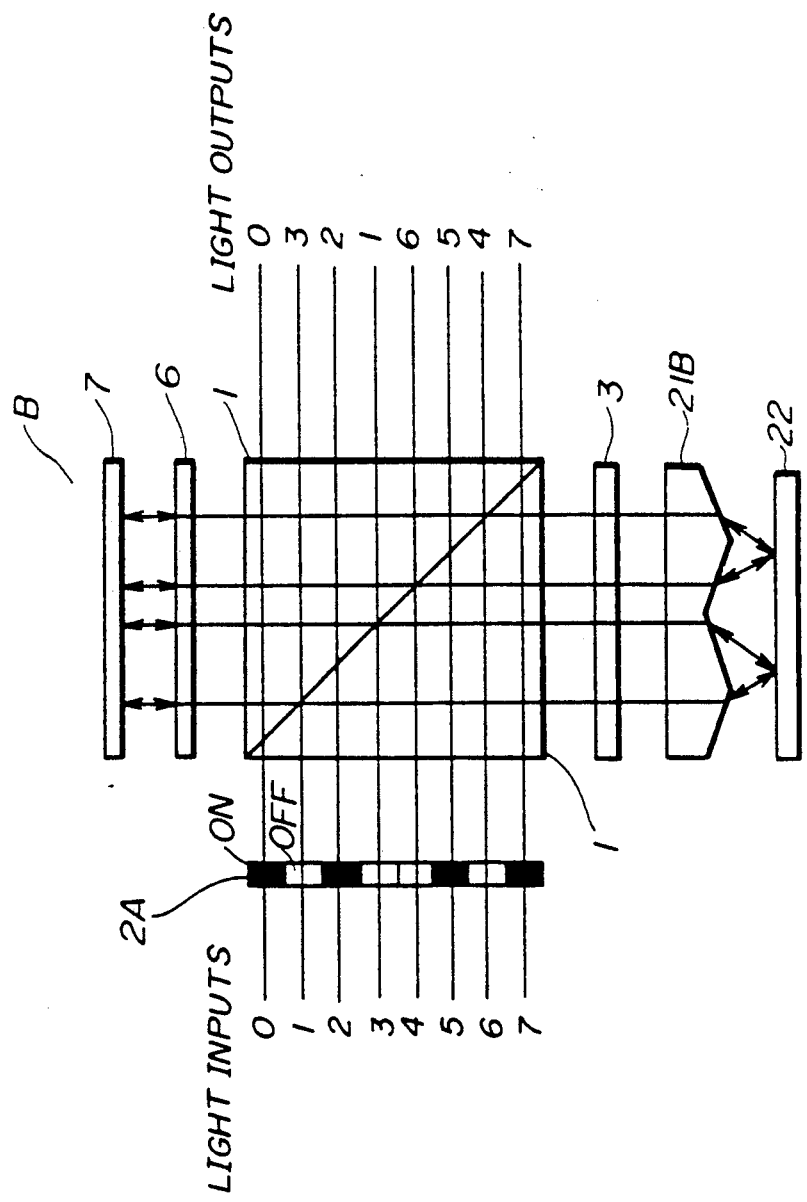
FIG. 17C is a diagram illustrating the operation of an optical space switch of a stage of the network shown in FIGS. 17A and 17B.

FIG. 17C illustrates an operation of the optical space switch B having the prism 21B obtained when the polarization controllers of the polarization controller array 2A have the states shown therein.

Figure 17D:
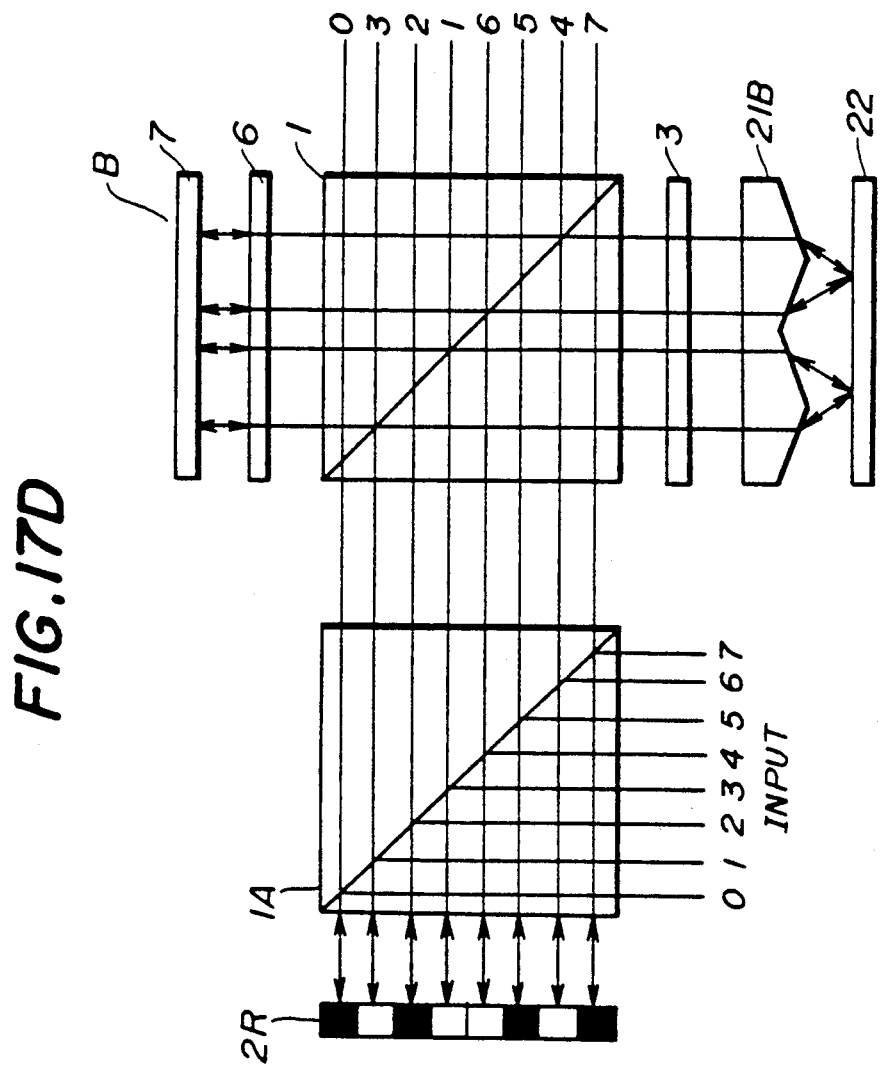
FIG. 17D is a diagram illustrating a variation of the optical space switch shown in FIG. 17C.

FIG. 17D illustrates a variation of the optical space switch B. The variation uses a reflection type polarization controller array 2R and a beam splitter 1A. The eight light inputs are reflected by the beam splitter 1A and then projected onto the corresponding polarization controllers of the array 2R. The reflected light beams pass through the beam splitter 1A and enter the polarization beam splitter 1. It will be noted that the use of the reflection type polarization controller array 2R is not limited to the switch B shown in FIG. 17A, but can be used instead of the aforementioned polarization controller array. For example, it is possible to replace the polarization controller 2 of the transparent type as shown in FIG. 4A by the reflection type polarization controller.

There is a possibility that the collision of two light signals may take place in an intermediate node. In this case, the two light signals have the mutually different directions of polarization. In FIG. 17B, solid lines denote light beams having the horizontal polarization, and broken lines denote right beams having the vertical polarization. Thus, it becomes possible to prevent the occurrence of switch impossible combinations by adding optical space switches for forming bypasses.

Figure 18A:
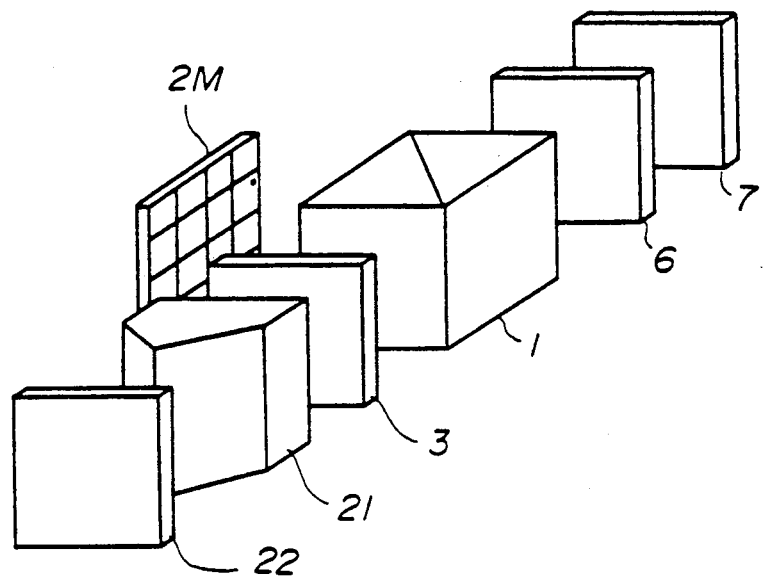
FIG. 18A is a diagram of a two-dimensional optical space switch according to a fifth preferred embodiment of the present invention which is based on the first embodiment of the present invention.

A description will now be given of a fifth preferred embodiment of the present invention with reference to FIG. 18A, in which those parts which are the same as those shown in the previous figures are given the same reference numerals. The fifth embodiment of the present invention is a two-dimensional optical space switch. Referring to FIG. 18A, a polarization controller array 2M is composed of a plurality of polarization controllers which are arranged in rows and columns. Of course, a signal source is connected to each of the polarization controllers. The prism 21 shifts light paths in each row of the array 2M in the horizontal (lateral) direction in the same way as described with reference to FIGS. 9A and 9B. The prism 21 has a size of, for example, 4 cm×4 cm and handles 64 light beams, for example.

Figure 18B:
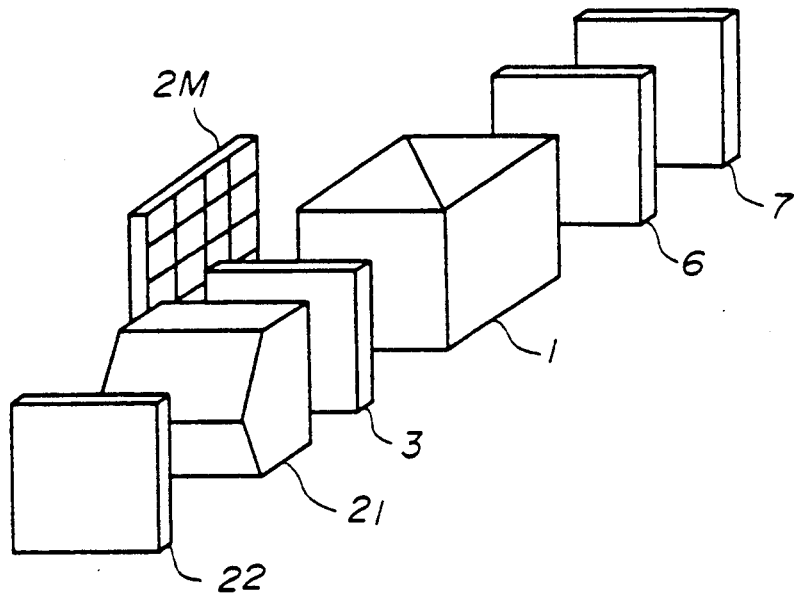
FIG. 18B is a diagram of a variation of the fifth preferred embodiment of the present invention shown in FIG. 18A.

FIG. 18B shows a variation of the arrangement shown in FIG. 18A. The prism 21 is placed so that it switches the light paths in the vertical (longitudinal) direction. That is, the light paths in each of the columns of the array 12M are switched by the prism 21 in the same way as described with reference to FIGS. 9A and 9B.

Figure 19A:
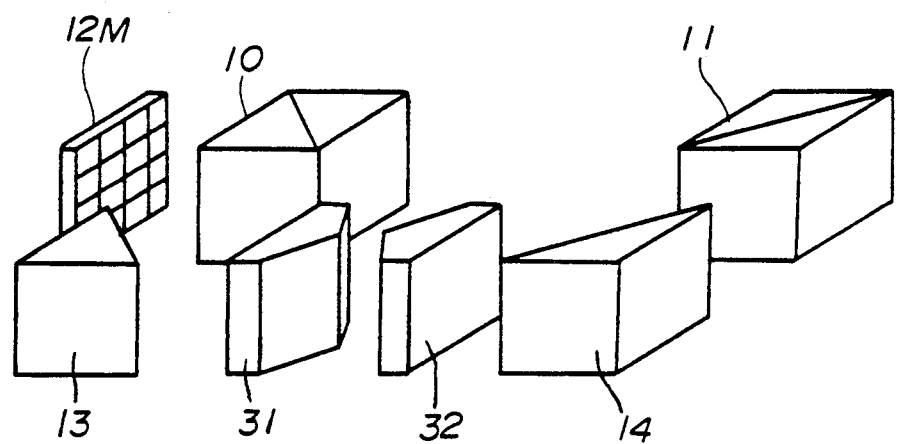
FIG. 19A is a diagram of a two-dimensional optical space switch based on the second embodiment of the present invention.

FIG. 19A illustrates a two-dimensional optical space switch based on the arrangement shown in FIGS. 7A and 7B. In FIG. 19A, those parts which are the same as those shown in FIG. 7A are given the same reference numerals. A polarization controller array 12M has a plurality of polarization controllers arranged in rows and columns. The combination of the prisms 31 and 32 switches the light paths in each row of the array 12M in the horizontal direction in the same way as shown in FIGS. 7A and 7B.

Figure 19B:
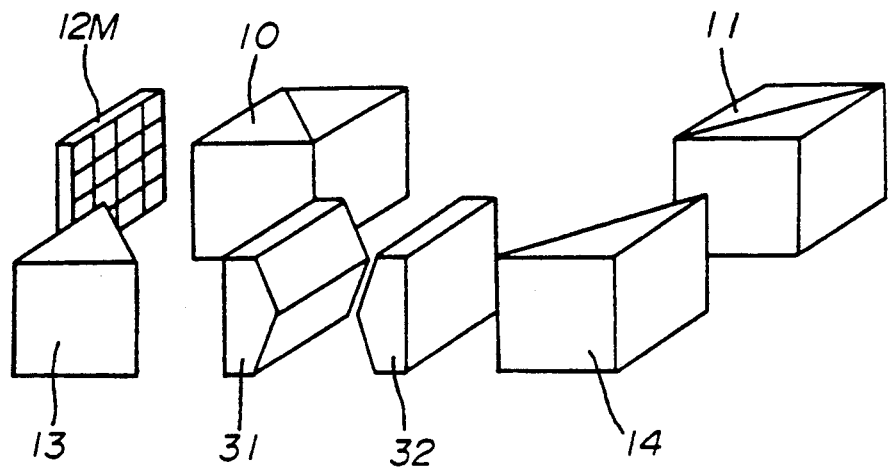
FIG. 19B is a diagram of a variation of the two-dimensional optical space switch shown in FIG. 19A.

FIG. 19B illustrates a two-dimensional optical space switch based on the arrangement shown in FIGS. 8A and 8B. The combination of the prisms 31 and 32 shown in FIG. 19B is arranged so that the light paths in each column of the array 12M are switched in the vertical direction in the same way as shown in FIGS. 7A and 7B.

Figure 20A:
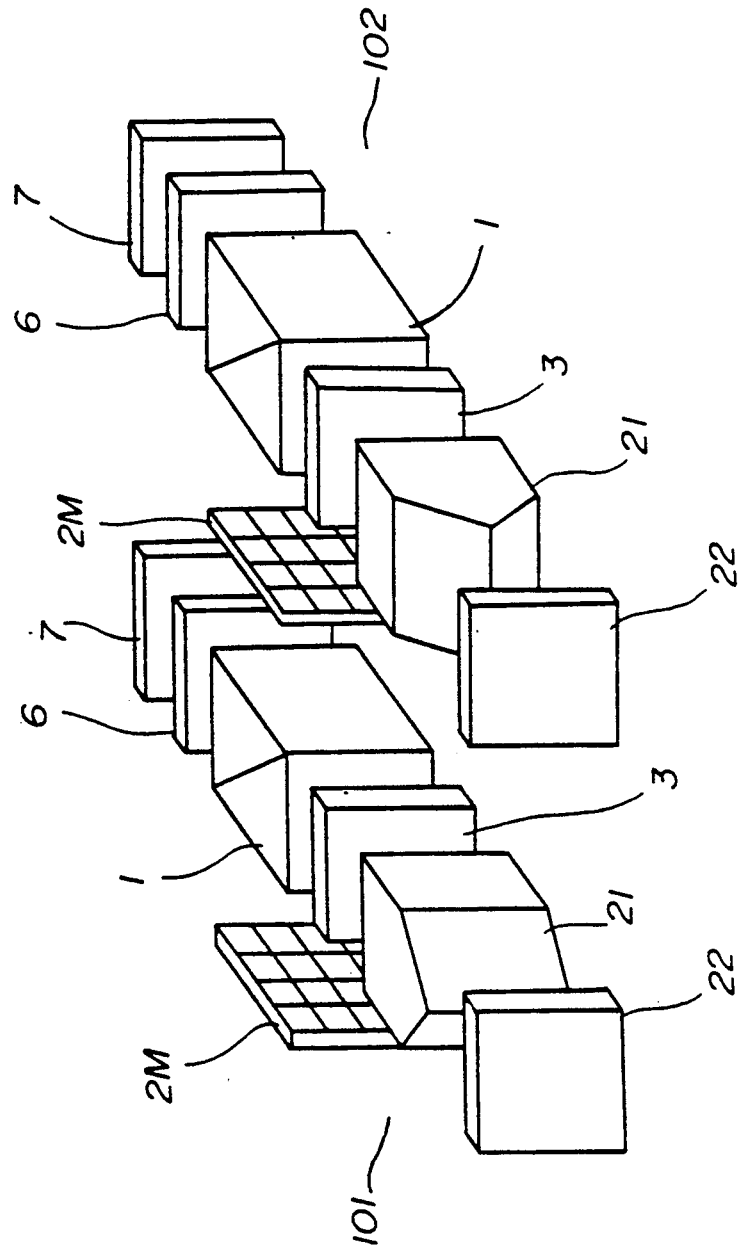
FIG. 20A is a block diagram of a two-dimensional optical space switch according to a sixth preferred embodiment of the present invention.

FIG. 20A illustrates an optical space switch according to a sixth preferred embodiment of the present invention. In FIG. 20A, those parts which are the same as those shown in FIGS. 18A and 18B are given the same reference numerals. The optical space switch shown in FIG. 20A is a two-dimensional optical switch, and is a combination of the optical space switches shown in FIGS. 18A and 18B. An optical space switch 101 is the same as that shown in FIG. 18A, and an optical space switch 102 is the same as shown in FIG. 18B. The optical space switch 101 switches the light paths in each of the rows of the array 2M in the horizontal direction. The optical space switch 102 switches the light paths in each of the columns of the array 2M in the vertical direction.

Figure 20B:
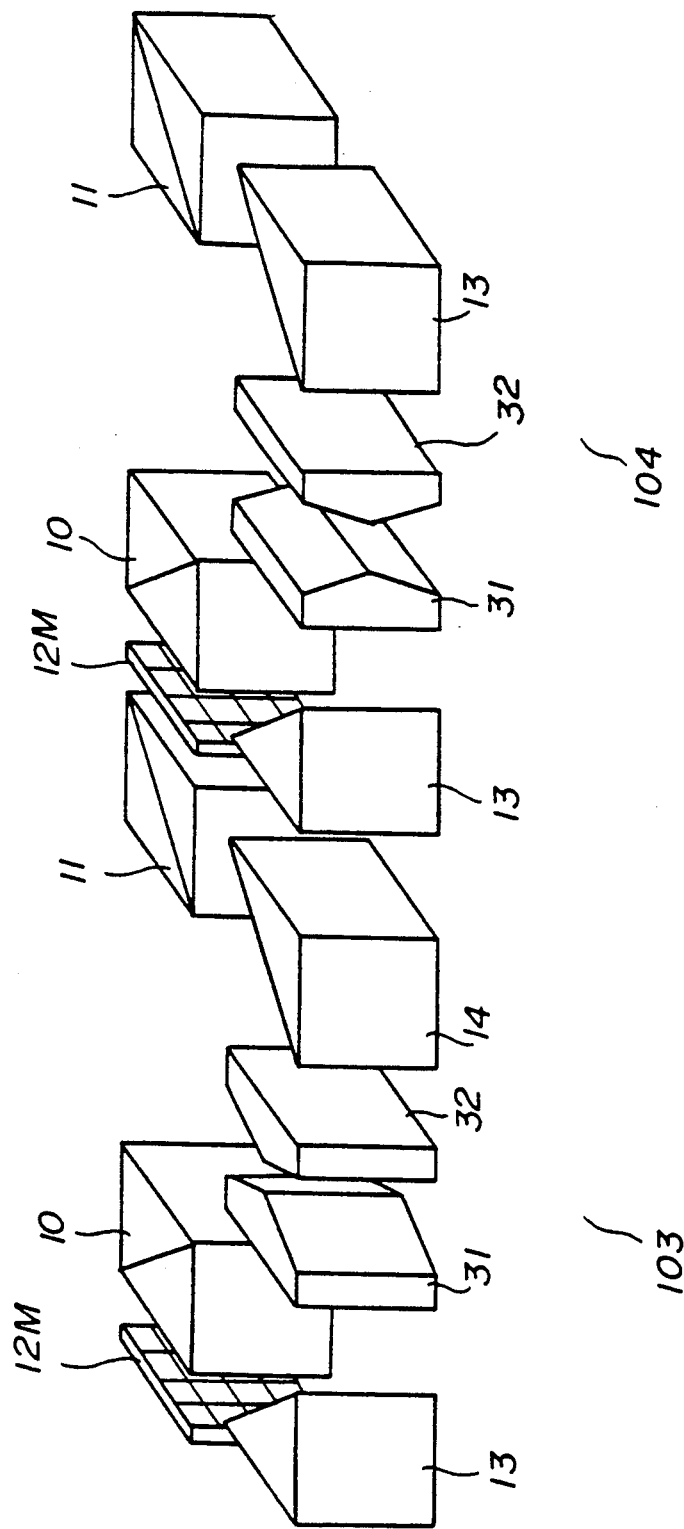
FIG. 20B is a block diagram of a variation of the two-dimensional optical space switch shown in FIG. 20A.

FIG. 20B illustrates another optical space switch of the two-dimensional type. In FIG. 20B, those parts which are the same as those shown in FIGS. 19A and 19B are given the same reference numerals. The optical space switch shown in FIG. 20B is a three-dimensional optical switch, and is a combination of the optical space switches shown in FIGS. 19A and 19B. An optical space switch 103 is the same as that shown in FIG. 19A, and an optical space switch 104 is the same as shown in FIG. 19B. The optical space switch 103 switches the light paths in each of the rows of the array 12M in the horizontal direction. The optical space switch 104 switches the light paths in each of the columns of the array 12M in the vertical direction.

Figure 21A:
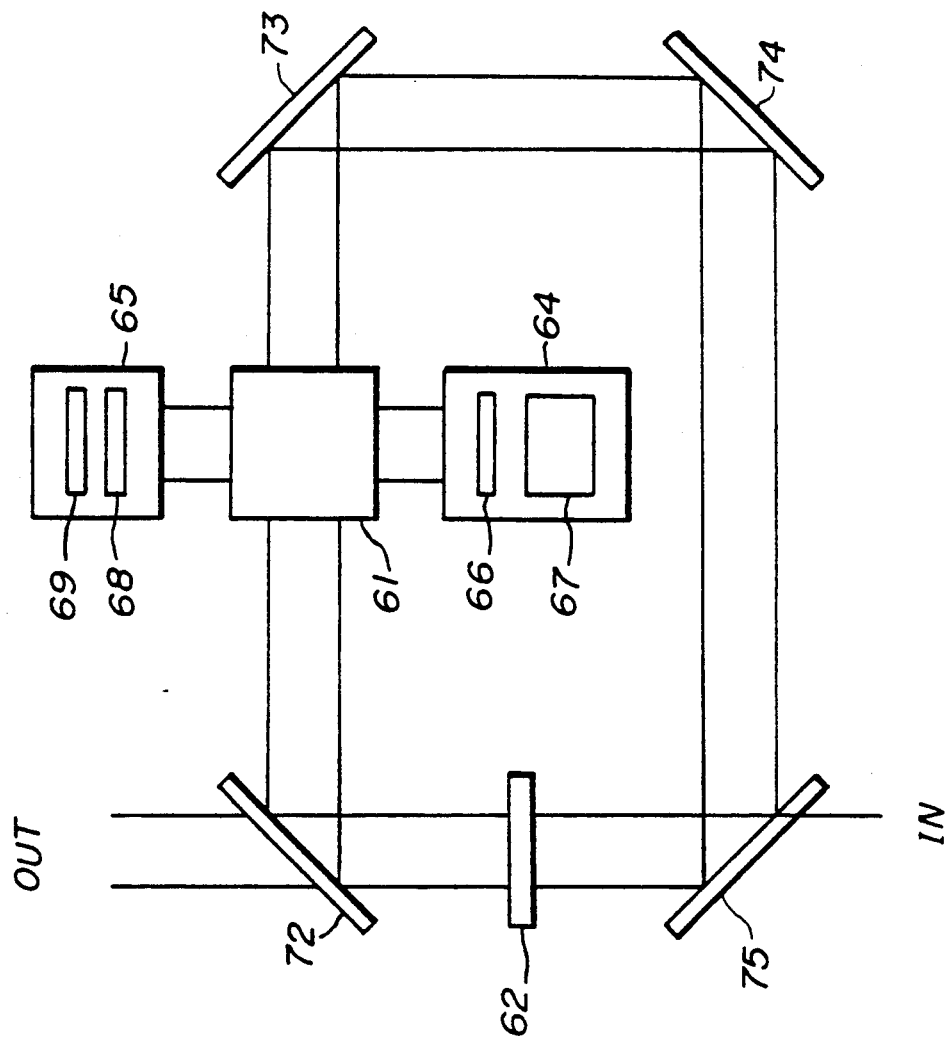
FIG. 21A is a block diagram of a circular multi-stage type optical space switch according to a seventh embodiment of the present invention.

FIG. 21A illustrates a seventh preferred embodiment of the present invention. The seventh preferred embodiment of the present invention is a one-dimensional circularly connected type optical space switch based on any of the aforementioned embodiments. The optical space switch shown in FIG. 21A is composed of a polarization beam splitter 61, a transparent type two-dimensional polarization controller array 62, a first reflection block 64, a second reflection block 65, and four reflection mirrors 72–75.

The polarization controller array 62 is located on the input side of the polarization beam splitter 61, which passes straight through or reflects the incident beam. The first reflection block 64 is positioned on the reflection side of the polarization beam splitter 61 where the reflected light therefrom is obtained. The first reflection block 64 is composed of a quarter wave plate 66 and a light path changing element 67. The quarter wave plate 66 is positioned perpendicular to its incident light so that the optical axis of the incident light is inclined at 45° with respect to the direction of polarization of the incident light. The second reflection block 65 is positioned on the side of the polarization beam splitter 61 opposite to the side thereof on which the first reflection block 64 is positioned. It is also possible to interchange the positions of the first and second reflection blocks 64 and 65 with each other. The second reflection block 65 is composed of a quarter wave plate 68 and a reflection mirror 69. The quarter wave plate 68 is positioned perpendicular to its incident light so that the optical axis thereof is inclined at 45° with respect to the direction of polarization of the incident light.

The input signal IN passes above the reflection mirror 75 and enters the polarization controller array 62. The polarization of the input light IN is changed from the vertical direction to the horizontal direction when the corresponding polarization controller of the array 62 is ON. On the other hand, the polarization of the input light IN is not changed when the corresponding polarization controller is OFF. The light having the horizontal polarization passes straight through the polarization beam splitter 61, and the light having the vertical polarization is reflected by the polarization beam splitter 61 and goes toward the first reflection block 64. The light having the vertical polarization is shifted by the first reflection block 64, and then output therefrom. Since the light passes through the quarter wave plate 66 two times, the output light from the first reflection block 64 has the horizontal polarization. Then, the output light passes straight through the polarization beam splitter 61 and enters the second reflection block 65. Since the light passes through the quarter wave plate 68 twice, light from the second reflection block 65 has the vertical polarization.

The light from the polarization beam splitter 61 having either the vertical or horizontal polarization is reflected by the mirrors 73, 74 75 and 72. That is, the input light passing through the polarization controller array 62 is circulated along a circulating path formed by the four reflection mirrors 72–75 and including the polarization beam splitter 61 and the polarization controller array 62. While the light is being circulated, the light path is shifted in a direction substantially perpendicular to the drawing sheet, for example, each time the light is reflected by each of the reflection mirrors 72-75. The light reflected by the reflection mirror 75 finally passes under the polarization controller array 62 and the reflection mirror 72, so that the output beam OUT is obtained. It will be noted that two output paths in the same plane as the input light IN are obtained. With this arrangement, it becomes possible to obtain two light paths of the output light with respect to the input light.

FIG. 21B is a variation of the arrangement shown in FIG. 21A. In FIG. 21B, those parts which are the same as those shown in FIG. 21A are given the same reference numerals. The variation shown in FIG. 21B uses a combination of a reflection type polarization controller array 2X and a beam splitter 79. The input light is reflected by the beam splitter 79 and enters the polarization controller array 2X. The input light is projected onto the corresponding polarization controller of the array 2X. When the corresponding polarization controller is ON, the polarization of the input light is changed by 90°. Then, the reflected light from the polarization controller array 2X passes through the polarization beam splitter 61, and is processed as in the case of the arrangement shown in FIG. 21A.

Figure 22A:
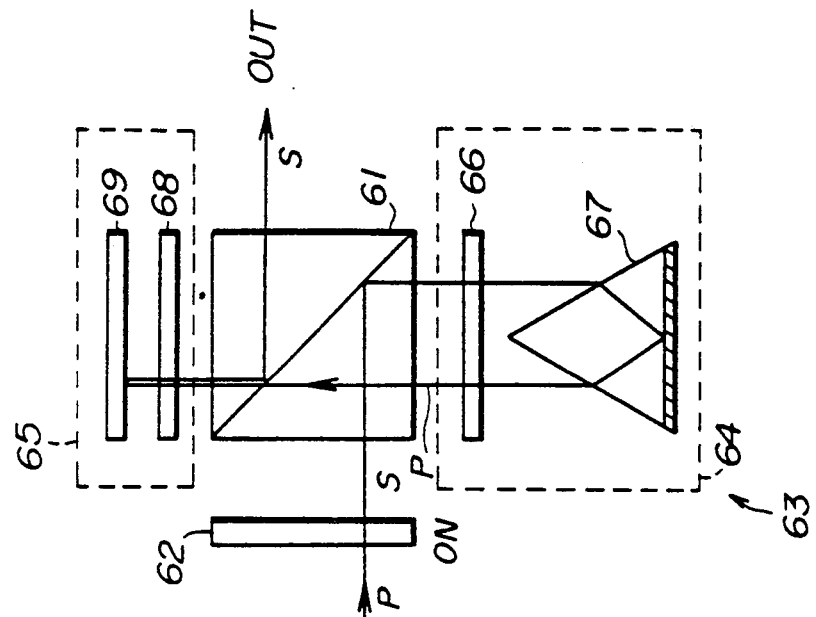
FIGS. 22A and 22B are diagrams illustrating the operation of a light path changing sub-unit used in the structures shown in FIGS. 21A and 21B.
Figure 22B:
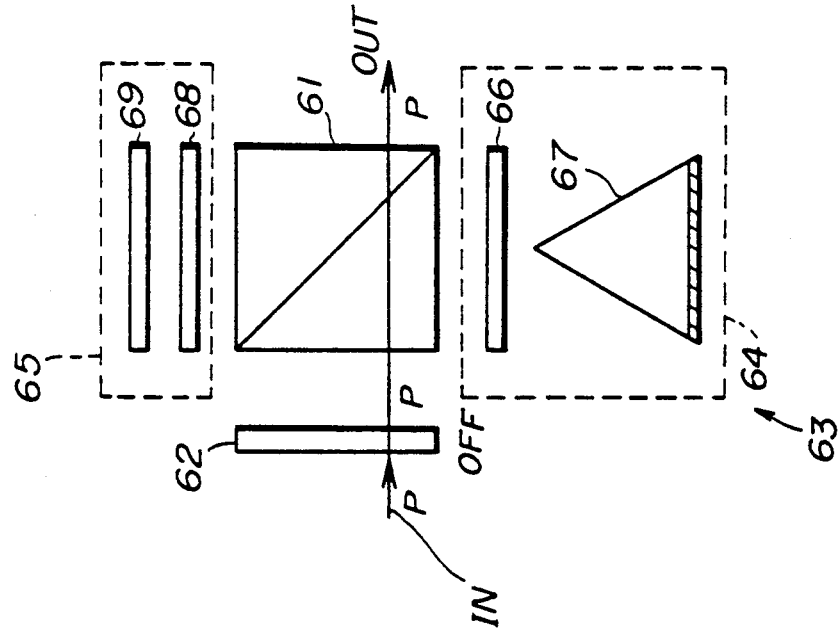

Referring to FIGS. 22A and 22B, there is illustrated the operation of the polarization beam splitter 61, the array 62, the first reflection block 64 and the second reflection block 65. Hereafter, the combination of the polarization beam splitter 61, the first reflection block 64 and the second reflection block 65 form a light path changing sub-unit 63. A capital letter "P" denotes light having the horizontal polarization, and "S" denotes light having the vertical polarization.

The light path changing element 67 of the first reflection block 64 is formed of an isosceles triangle shape prism having a bottom surface on which a reflection coating layer is formed. It is also possible to form the light path changing element 67 of any of the aforementioned different type elements. As shown in FIG. 22B, the incident beam is shifted by a distance based on the shape and size of the prism. It will be noted that the shifted distance does not depend on the position where the incident beam is projected onto the prism.

The use of the aforementioned optical space switch can realize a simple multi-stage switching. Referring to FIG. 23, there is illustrated the principle of a circular multi-stage type optical space switch. In FIG. 23, those parts which are the same as shown in the previous figures are given the same reference numerals. The reflection mirrors 72 and 73 are arranged so that they are symmetrical with each other with respect to a first line, and the reflection mirrors 73 and 74 are arranged so that they are symmetrical with each other with respect to a second line orthogonal to the first line. The reflection mirror 75 slightly deviates outward from the symmetrical position. The input light IN is slightly shifted in the same plane during a time when it is being circulated along the circulating path formed by the reflection mirrors 72 through 75. Finally, the light passes aside the reflection mirror 75, so that the output light OUT is obtained. The polarization controller array 62 and the light path changing sub-unit 63 are arranged perpendicular to the circulating path, and the axis of the sub-unit 63 is arranged perpendicular to the drawing sheet (or horizontal thereto). Thus, when the corresponding polarization controllers of the array 62 are OFF, the switch operates as if it does not have the array 62 and the sub-unit 63. On the other hand, when a polarization controller on a corresponding circulating path of the input light IN is ON, this light path is shifted in the same plane by the light path changing sub-unit 63. In this way, each time the light passes through the polarization controller array 62, it is possible to determine whether the light should be shifted by the light path changing sub-unit 63. This means that the optical space switch shown in FIG. 23 corresponds to an arrangement in which a plurality of stages of combinations of the polarization controller arrays 62 and the light path changing sub-units 63 are cascaded. As will be described later, a special prism unit is employed in the light path changing sub-unit 63 in order to realize multi-stage switching networks as described above.

Figure 24A:
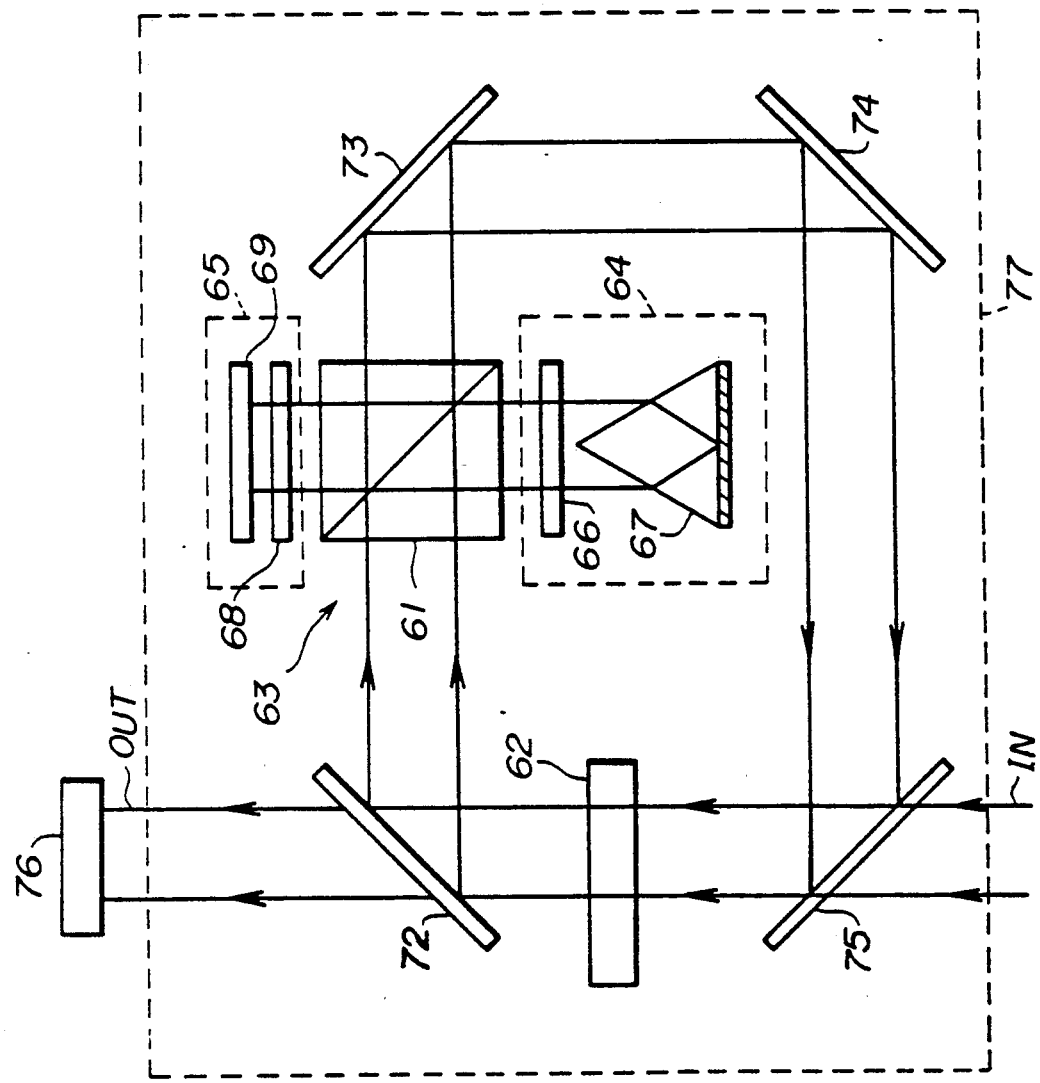
FIG. 24A is a block diagram illustrating the structure shown in FIG. 21A in more detail.

FIG. 24A illustrates the structure of the optical space switch shown in FIG. 21A in more detail. In FIG. 24A, those parts which are the same as those shown in the previous figures are given the same reference numerals. The prism 67 of the first reflection block 64 of the optical space switch (now labeled 77) is formed of a prism unit, which will be described later. The reflection mirrors 72 and 73 are arranged so that they are symmetrical with each other with respect to the aforementioned first line. Similarly, the reflection mirrors 74 and 75 are arranged so that they are symmetrical with each other with respect to the first line. The reflection mirrors 73 and 74 are arranged so that they are symmetrical with each other with respect to the aforementioned second line orthogonal to the first line. Similarly, the reflection mirrors 72 and 75 are arranged so that they are symmetrical with each other with respect to the second line. Each of the reflection mirrors 72 through 75 is slightly inclined with respect to the drawing sheet surface. The input light IN passes through the polarization controller array 62 and is obliquely projected onto the reflection mirror 72 at an angle of 45° with respect to its mirror surface. Each time the light is reflected by any of the reflection mirrors 72 through 75, the light path is slightly shifted so that it becomes apart from the back surface of the drawing sheet. Finally, the light goes aside the reflection mirror 72, so that the output light OUT is obtained. The output light OUT is received by a two-dimensional array 76 of photosensor elements. The two-dimensional polarization controller array 62 and the light path changing sub-unit 63 are arranged so that they are perpendicular to the circulating paths. The light path changing sub-unit 63 is disposed so that its axis is parallel (or perpendicular) to the drawing sheet surface. The circulating light passes through the one-dimensional array of a corresponding row or column of the polarization controller array 62. The circulating light is shifted in the same plane by the light path changing sub-unit 63.

When the array of the corresponding row or column of the polarization controller array 62 is OFF, the input light IN having a plurality of independent light inputs (beams) is circulated as if the array 62 and the sub-unit 63 are not provided in the switch 77. On the other hand, when the array is ON, the polarization of the input light IN is changed by 90° by the corresponding row or column. Then, the light path of the input light IN (that is, the light paths of the light inputs of the input light IN) is shifted by the light path changing sub-unit 63, so that the light therefrom goes along a light path different from that of the light obtained when the array is OFF. Then, the light passes through the polarization controller array 62 and the light path changing sub-unit 63. Thereby, the light enters the array of a row or column different from the previous row or column, and is shifted in a plane different from the previous plane. After the above-mentioned operation is repeatedly carried out, the light leaves the circulating loop by passing below the down side of the reflection mirror 72, and is received by any of the photosensor elements of the array 76. In this way, the optical space switch 77 switches the light paths of the output light OUT with respect to the input light IN in the same plane. It should be noted that the optical space switch 77 shown in FIG. 24A has a multiple stage structure.

Figure 24B:
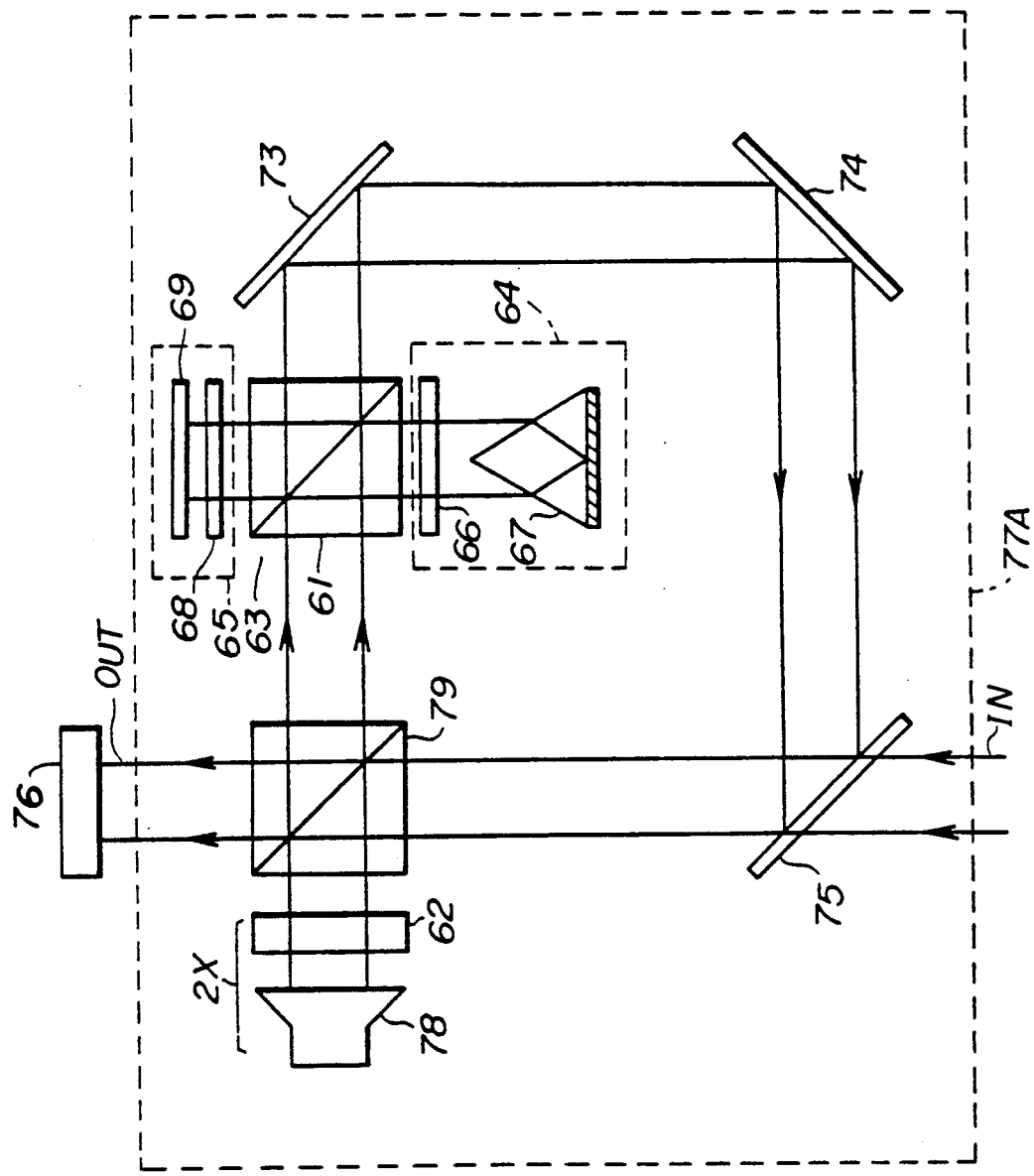
FIG. 24B is a block diagram illustrating the structure shown in FIG. 21B in more detail.

FIG. 24B illustrates a variation 77A of the optical space switch 77 shown in FIG. 24A. In FIG. 24B, those parts which are the same as those shown in FIG. 24A are given the same reference numerals. The two-dimensional polarization controller array 62 is positioned on the input side of the polarization beam splitter 61. The reflection type polarization controller array 2X is composed of the two-dimensional polarization controller array 62 and an external controller 78. The input light IN is reflected by the beam splitter 79 formed of a half mirror or the like and enters the reflection type polarization controller array 2X, which changes the polarization of the incident light under the control of the external controller 78. The beam splitter 79 reflects or passes straight through the incident light irrespective of the polarization thereof. The light reflected by the polarization controller array 2X passes through the beam splitter 79, and enters the light path changing sub-unit 63. Then, the light is circulated in the same way as the optical space switch 77 shown in FIG. 24A.

The variation 77A shown in FIG. 24B has an advantage over the switch 77 shown in FIG. 24A. That is, since the reflection type polarization controller array 2X is located outside of the circulating paths, it is possible to directly carry out the polarization control by optical signal inputs via the external controller 78.

Figure 25:
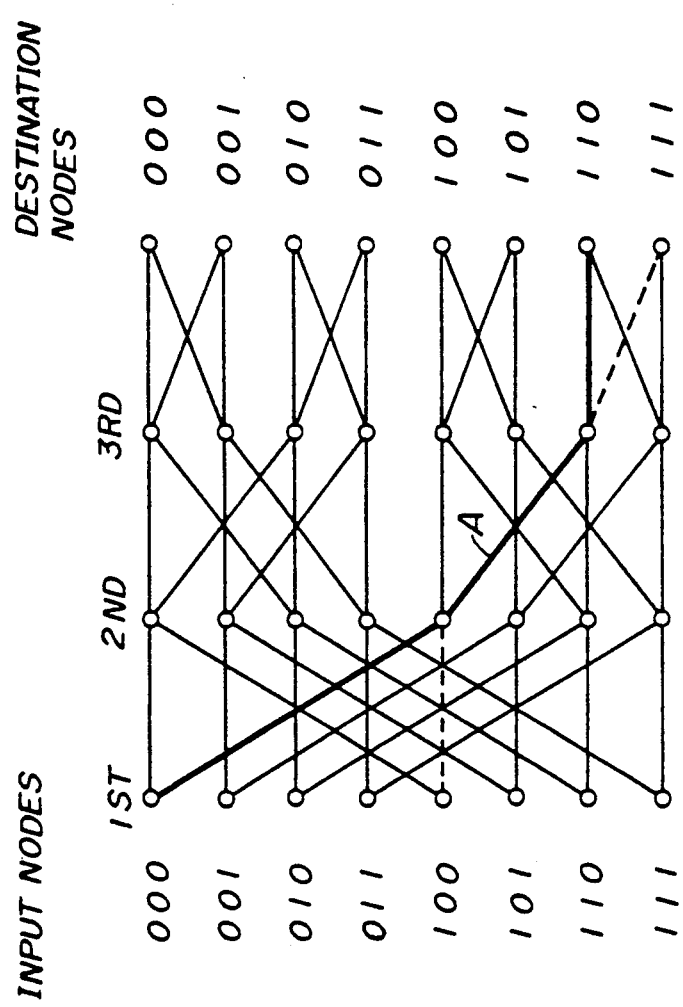
FIG. 25 is a diagram illustrating an optical Banyan network and disadvantages thereof.

The optical space switch shown in FIG. 24A or FIG. 24B can provide an optical Banyan network shown in FIG. 25. The optical Banyan network in FIG. 25 has $2^3$ inputs and $2^3$ outputs. The network has eight input nodes 000–111 and eight output nodes 000–111. A cross-connect structure is formed between the eight inputs nodes 000–111 and the eight output nodes 000–111. It will be noted that n optical space switches as shown in FIG. 22A or FIG. 22B must be cascaded in order to provide an optical Banyan network having $2^n$ inputs and $2^n$ outputs.

Figure 26A:
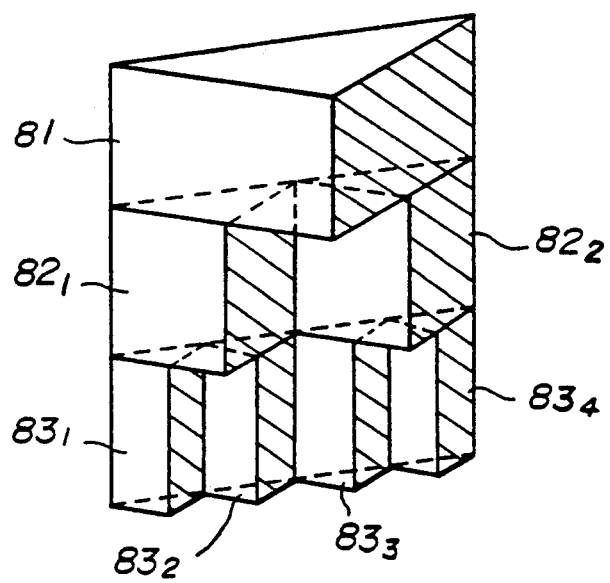
FIG. 26A is a perspective view of a prism unit which realizes the optical Banyan network shown in FIG. 25.
Figure 26B:
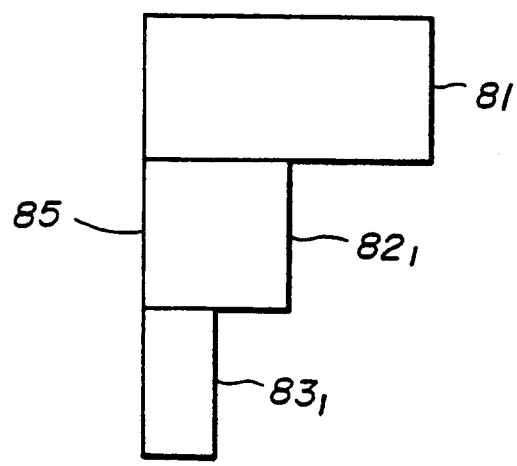
FIG. 26B is a side view of the prism unit shown in FIG. 26A.

FIG. 26A is a perspective view of a prism unit used for realizing the optical Banyan network shown in FIG. 25, and FIG. 26B is a side view of the prism unit shown in FIG. 26A. The prism unit shown in FIGS. 26A and 26B is used as the prism 67 of the first reflection block 64. The prism unit is composed of a prism 81 of a first stage, prisms $82_1$ and $82_2$ of a second stage, and prisms $83_1$, $83_2$, $83_3$ and $83_4$ of a third stage in a first direction. Each of these prisms has a similar isosceles triangle shape. The prisms $82_1$ and $82_2$ are arranged side by side in a second direction perpendicular to the first direction, and the prisms $83_1$–$83_4$ are also arranged side by side in the second direction. Each of the prisms $82_1$ and $82_2$ of the second stage has a size half that of the prism 81 of the first stage. Each of the prisms $83_1$–$83_4$ has a size half that of each of the prisms $82_1$ and $82_2$ of the second stage. Bottom surfaces of all the prisms are placed in the same plane. A reflection coating film 85 is formed on the bottom surfaces of all the prisms.

Each of the prisms shifts its incident light in parallel and reflects it. The shifted distance between the input path and the output path is constant in each prism. The prism 81 has the largest shifted distance, and each of the prisms $82_1$ and $82_2$ has a shifted distance half of that of the prism 81. Further, each of the prism $83_1$–$83_4$ has a shifted distance quarter of that of the prism 81.

Figure 27:
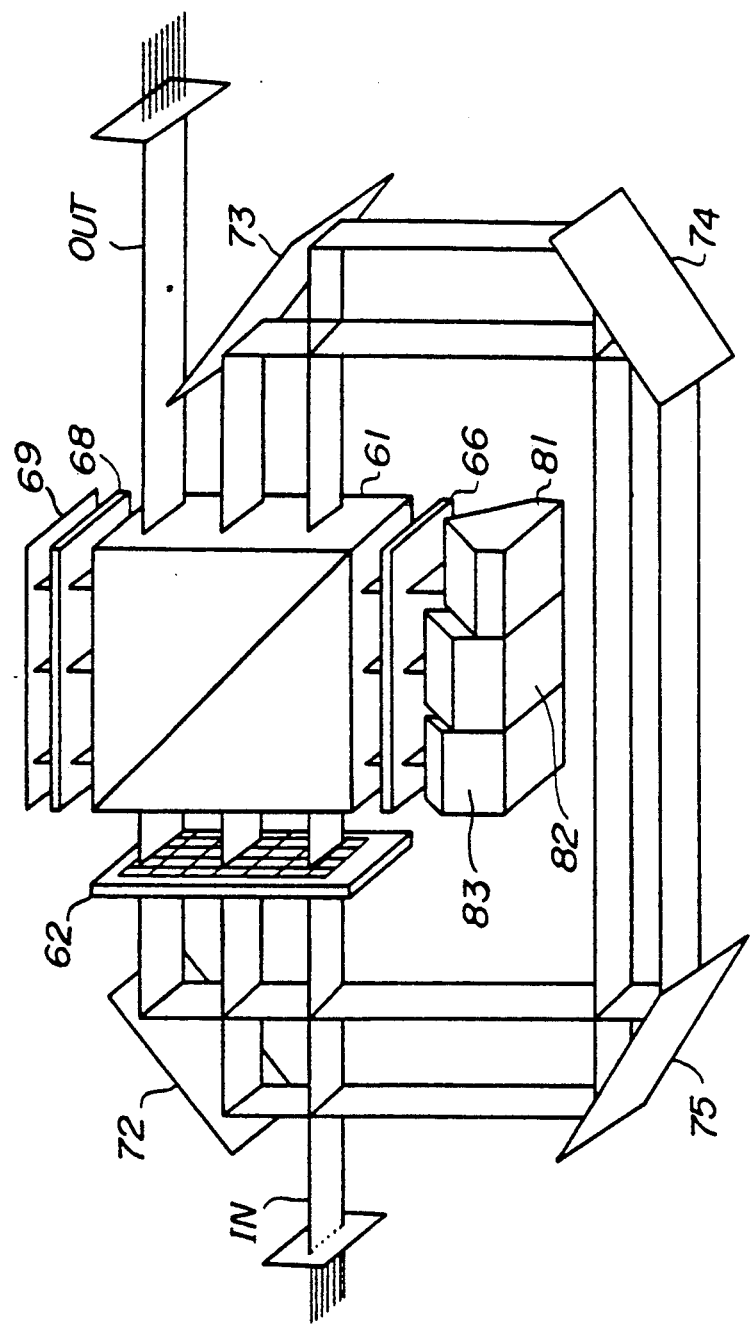
FIG. 27 is a perspective view of a one-dimensional circulating connected type optical space switch according to the seventh embodiment of the present invention.

FIG. 27 is a perspective view of the structure of an optical Banyan switch using the aforementioned one-dimensional circularly connected type optical space switch according to the seventh preferred embodiment of the present invention. In FIG. 27, those parts which are the same as those shown in the previous figures are given the same reference numerals. A reference numeral 82 indicates the prisms $82_1$ and $82_2$, and a reference numeral 83 indicates the prisms $83_1$–$83_4$. It should be noted that the position of the two-dimensional polarization controller array 62 is different from that shown in FIG. 24A, and the positions of the input light IN comprising a plurality of optical input signals and output light OUT having a plurality of optical output signals are also different from those shown in FIG. 24A. However, the operation of the switch shown in FIG. 27 is the same as that of the switch shown in FIG. 24A.

Figure 28A:
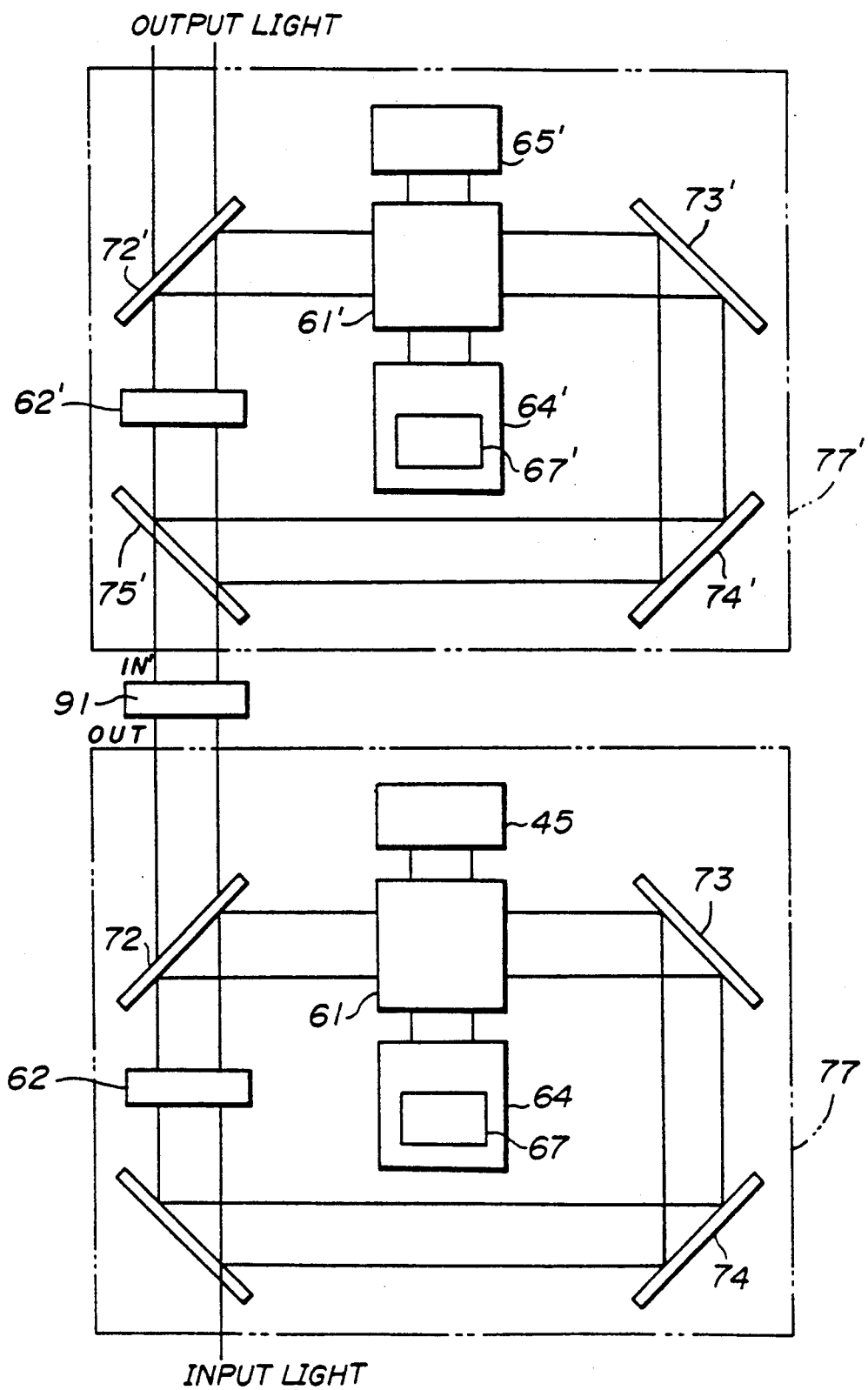
FIG. 28A is a diagram illustrating a two-dimensional circularly connected type optical space switch according to an eighth preferred embodiment of the present invention.

A description will now be given of an eighth preferred embodiment of the present invention with reference to FIG. 28A, in which those parts which are the same as shown in the previous figures are given the same reference numerals. The eighth embodiment of the present invention is a two-dimensional circularly connected type optical space switch which uses the transparent type polarization controller array. As shown in FIG. 28A, two one-dimensional circularly connected type optical space switches 77 and 77' are coupled via a multi-stage coupler 91. The optical space switch 77' is the same as the optical space switch 77 shown in FIG. 21A. It will be noted that those elements of the optical space switch 77' which are the same as those of the optical space switch 77 are given a mark ['] in addition to the corresponding reference numerals. The light path changing elements 67 and 67' are arranged so that the light path changing plane of the element 67 is orthogonal to that of the element 67'. The light path changing elements 67 and 67' are formed of the prism units as shown in FIGS. 26A and 26B. The center axis of each prism of the element 67 is perpendicular to that of each prism of the element 67'. The light output OUT from the optical space switch 77 passes through the multi-stage coupler 91, and is projected onto the two-dimensional polarization controller array 62' as input light IN'. The multi-stage coupler 91 changes the position of the output light OUT (which is a position in a direction which becomes apart from the back surface of the drawing sheet), and outputs the output light OUT having the changed position to the optical space switch 77' as the input light IN'.

Figure 29A:
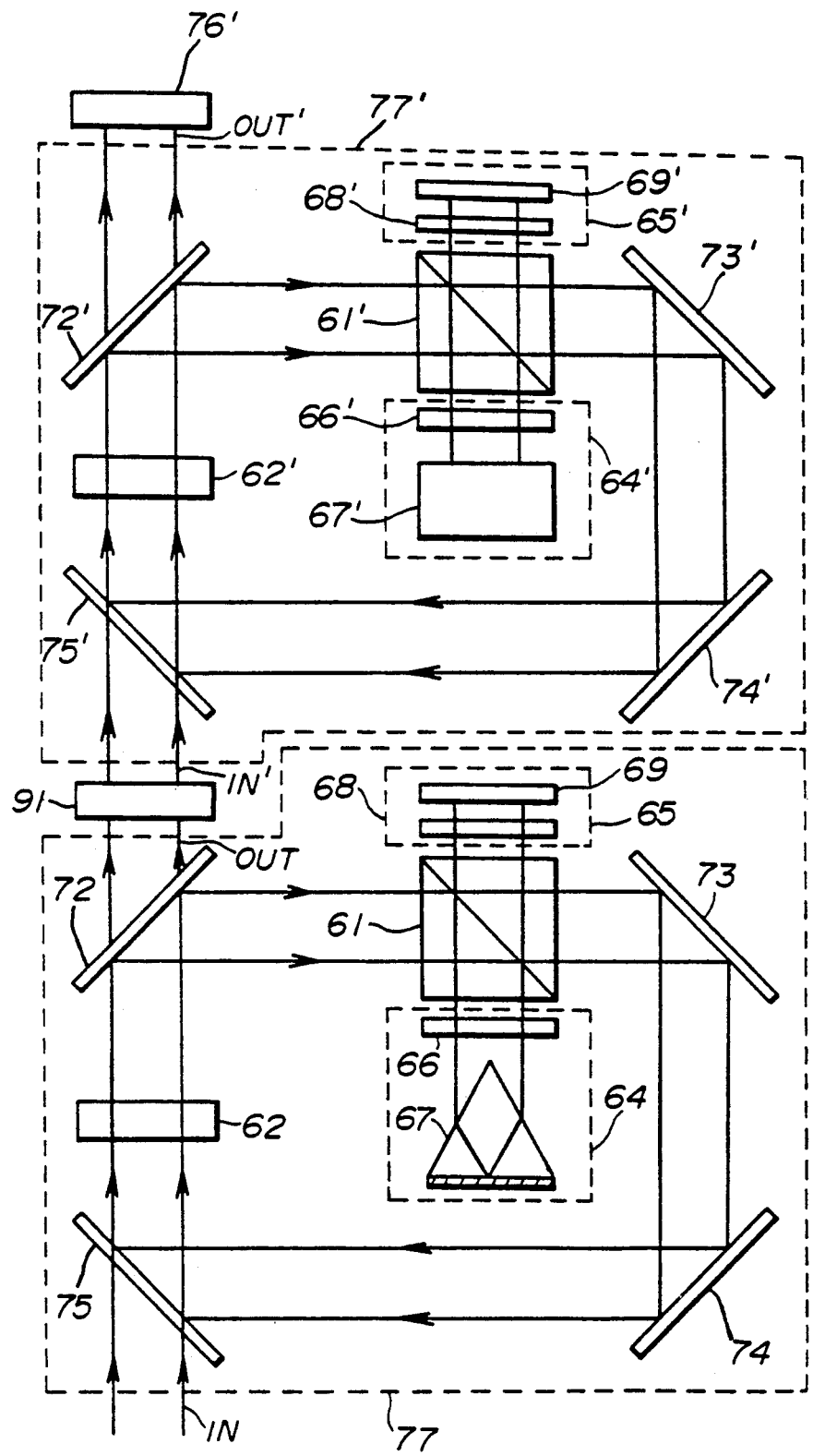
FIG. 29A is a diagram illustrating the optical space switch shown in FIG. 28A in more detail.

FIG. 29A is a diagram illustrating the configuration shown in FIG. 28A in more detail. In FIG. 29A, those parts which are the same as those shown in the previous figures are given the same reference numerals. Output light OUT' from the optical space switch 77' is received by the two-dimensional photosensor array 76'.

The two-dimensional optical space switch shown in FIGS. 28A and 29A can switch the light paths of the output light OUT' with respect to the input light IN in two dimensions. Thus, the two-dimensional optical space switch shown in FIGS. 28A and 29A easily provides a compact multi-stage optical Banyan network which has $2^n \times 2^n$ inputs and $2^n \times 2^n$ outputs. The optical space switch 77 realizes a crossconnect structure in the same plane, and the optical space switch 77' realizes a crossconnect structure in the plane orthogonal to the above plane related to the optical space switch 77.

Figure 28B:
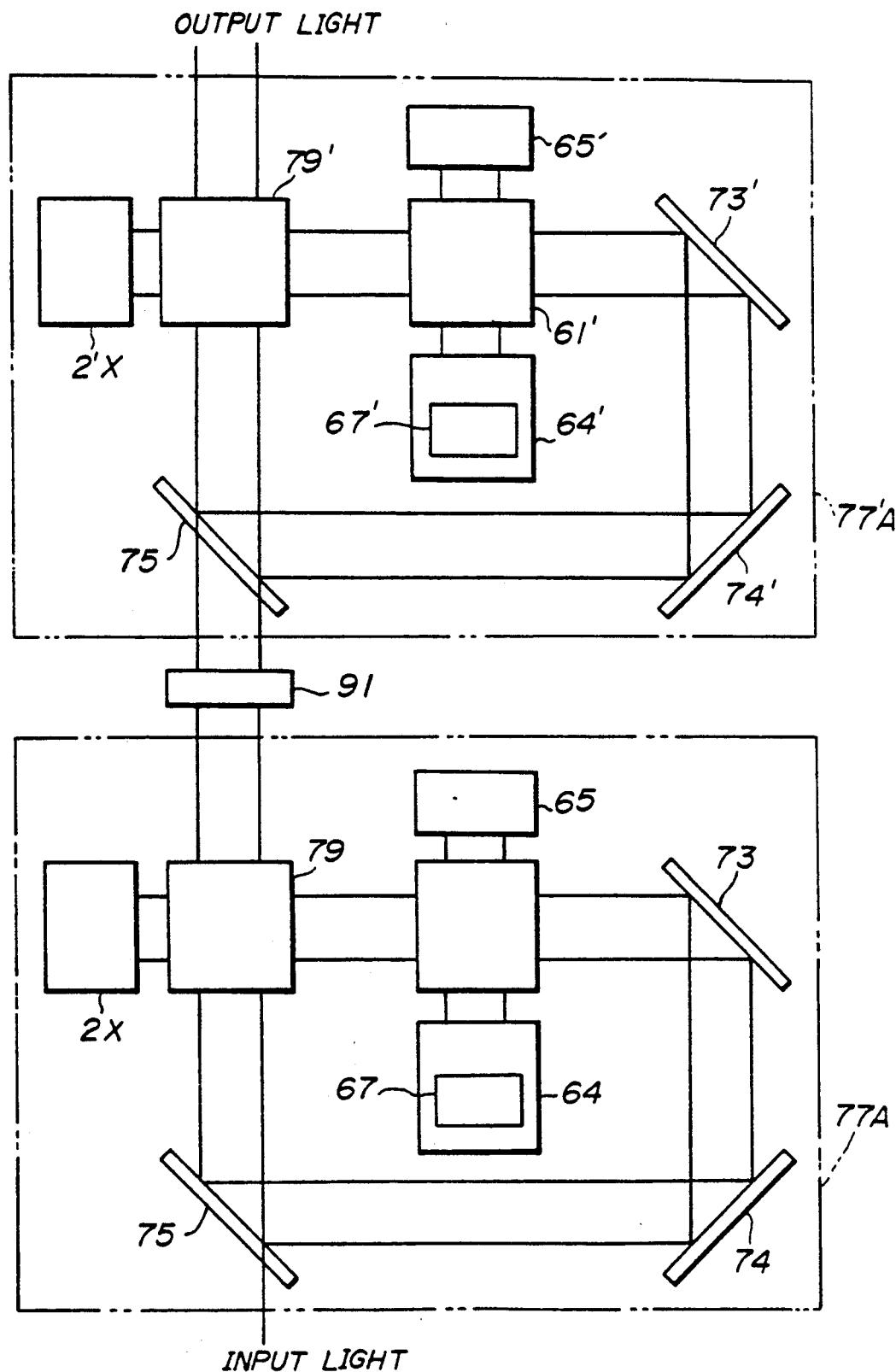
FIG. 28B is a diagram illustrating a variation of the optical space switch shown in FIG. 28A.
Figure 29B:
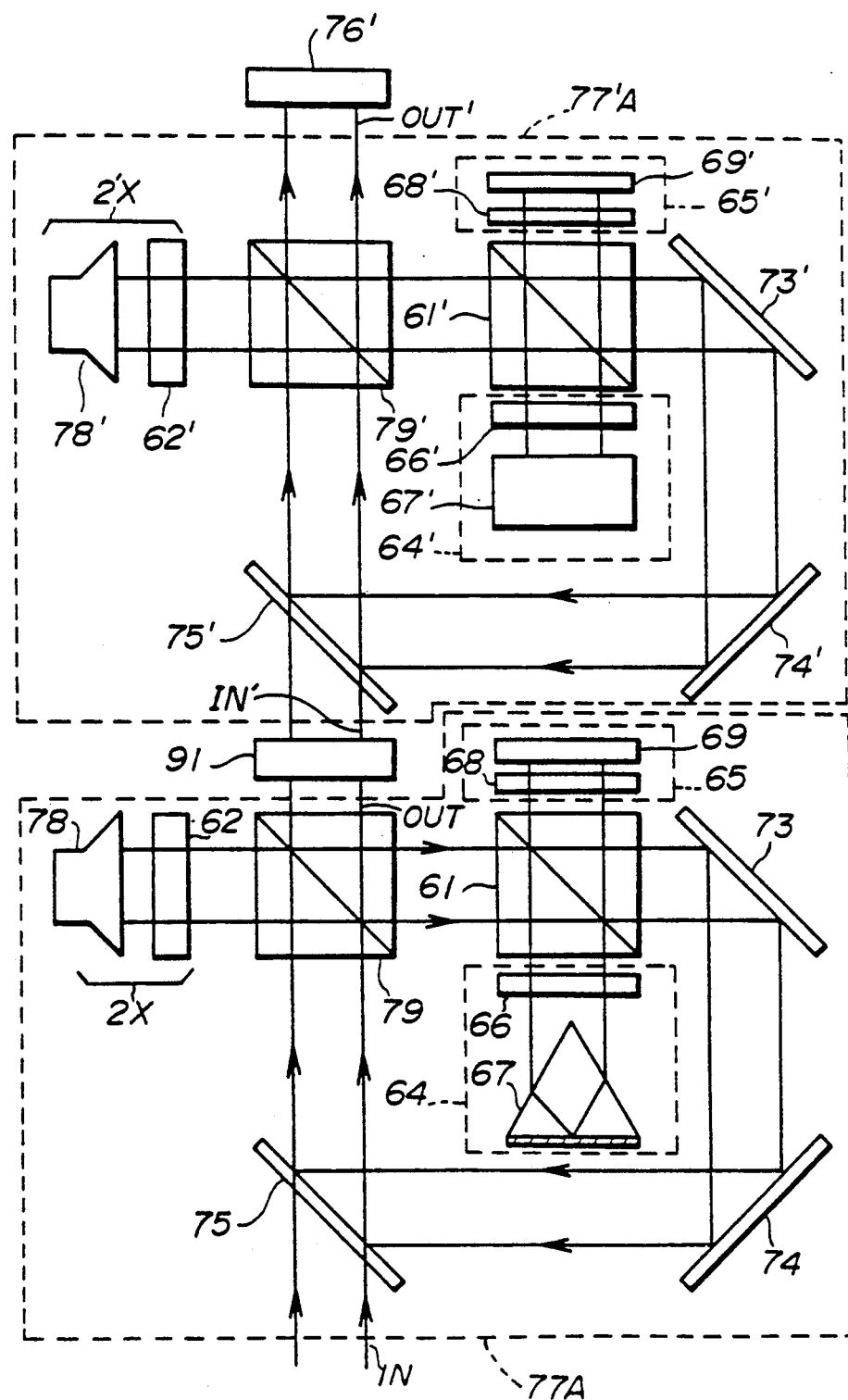
FIG. 29B is a diagram illustrating the optical space switch shown in FIG. 28B in more detail.

FIG. 28B illustrates a variation of the two-dimensional optical space switch shown in FIGS. 28A and 29A, and FIG. 29B illustrates the variation shown in FIG. 28B in more detail. In FIGS. 28B and 29B, those parts which are the same as those shown in the previous figures are given the same reference numerals. The variation in FIGS. 28B and 29B uses reflection type two-dimensional polarization controller arrays 2X and 2'X. The optical space switches 77A and 77'A are coupled to each other via the multi-stage coupler 91. The two-dimensional circularly connected type optical space switch shown in FIGS. 28B and 29B operates in the same way as that shown in FIGS. 28A and 29A except the operation of the polarization controller array. The switch shown in FIGS. 28B and 29B also provides the two-dimensional optical Banyan network.

A description will now be given of a modification of the circularly connected type optical space switch shown in FIG. 27. This modification can provide a non-blocking optical Banyan network. In the optical Banyan network realized by the optical space switch shown in FIG. 27, there is a possibility that a blocking state occurs. In the blocking state, the input node cannot be connected to the destination node.

Referring to FIG. 25 which has been described previously, a light path from the input node 000 to the destination node 110 and a light path from the input node 100 to the destination node 111 use a link denoted by A in common. Thus, the signals on these light paths may have a collision with each other. In this case, it is impossible to connect the input nodes to the desirable destination nodes.

Figure 30:
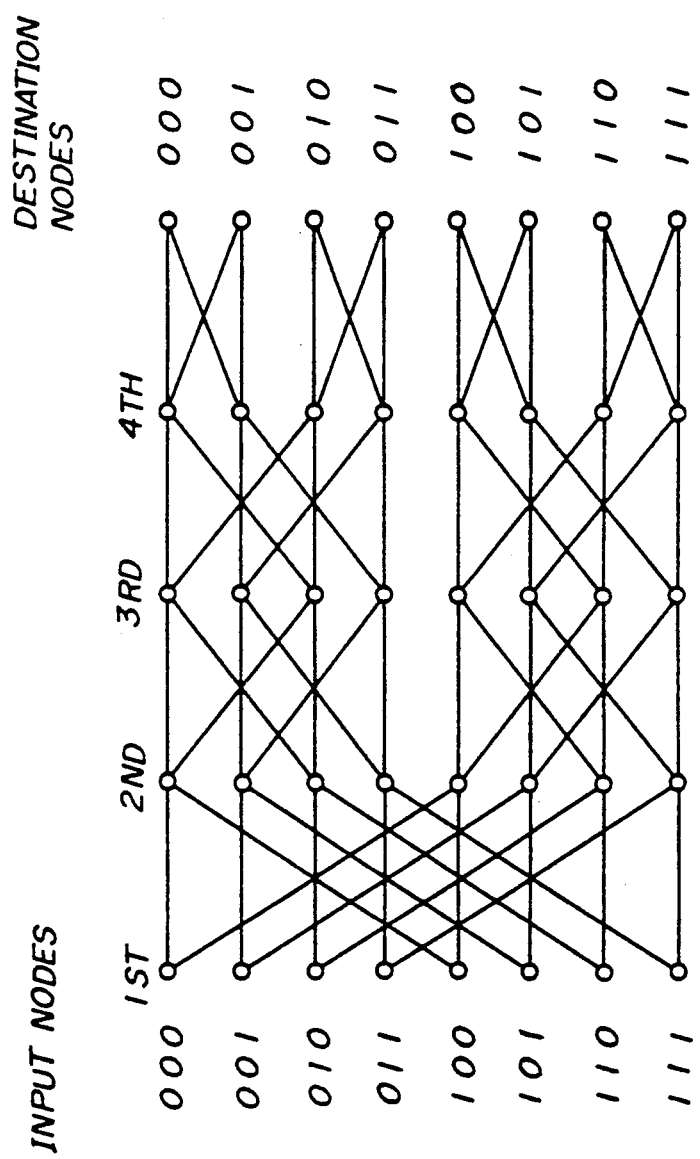
FIG. 30 is a block diagram of a non-blocking optical Banyan network which is realized on the basis of the seventh embodiment of the present invention.

FIG. 30 is a diagram of a non-blocking optical Banyan network according to the modification. The network shown in FIG. 30 has eight inputs and four cascaded stages. It should be noted that the pattern of light paths extending from the second stage is symmetrical with the pattern of light paths extending from the third stage with respect to the third stage. This symmetrical pattern of the light paths prevents the occurrence of blocking since the polarization of the optical signals obtained at each node at the same time have the mutually different polarization directions without exception and thus these optical signals go on the different paths extending from each node.

Figure 31A:
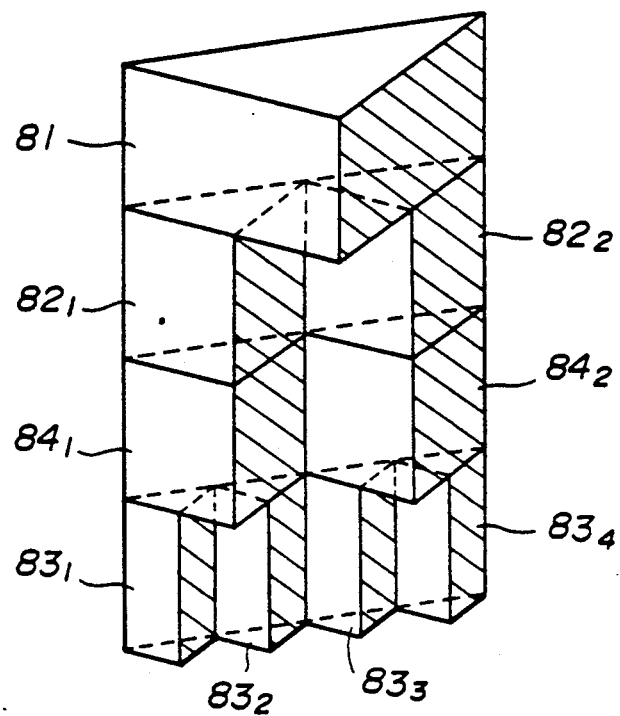
FIG. 31A is a perspective view of a prism unit which realizes the non-blocking optical space network shown in FIG. 30.
Figure 31B:
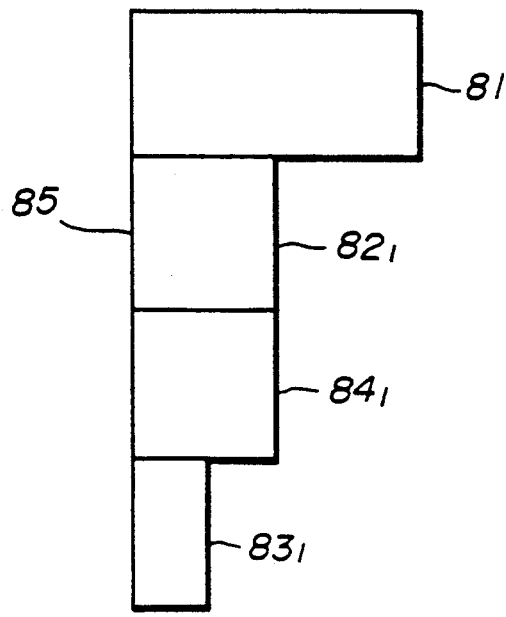
FIG. 31B is a side view of the prism unit shown in FIG. 31A.

FIGS. 31A and 31B show a prism unit used for realizing the non-blocking optical Banyan network shown in FIG. 30. The prism unit shown in FIGS. 31A and 31B is used instead of the prism unit shown in FIG. 27. In FIGS. 31A and 31B, those parts which are the same as those shown in FIGS. 26A and 26B are given the same reference numerals. The prism unit shown in FIGS. 31A and 31B is composed of the prism 81 of the first stage, the prisms $82_1$ and $82_2$ of the second stage, prisms $84_1$ and $84_2$ of the third stage, and the prisms $83_1$ through $83_4$ of the fourth stage. The prism 81 is formed of an isosceles triangle shape prism having the largest size. The prisms $82_1$ and $82_2$ of the second stage and the prisms $84_1$ and $84_2$ of the third stage are the same as each other, and formed of a similar isosceles triangle shape prism having a size half that of the prism 81 of the first stage. Each of the prisms $83_1$ through $83_4$ of the fourth stage is formed of a similar isosceles triangle shape prism having a size half of each of the prisms of the second and third stages. It will be seen that the use of the prism unit shown in FIGS. 31A and 31B realizes the non-blocking optical Banyan network shown in FIG. 30. It should be noted that it is possible to apply the prism unit shown in FIGS. 31A and 31B to any of the aforementioned one-dimensional circularly connected type optical space switches. Further, it is possible to provide a two-dimensional non-blocking optical Banyan network by applying the prism unit shown in FIGS. 31A and 31B to any of the arrangements shows in FIGS. 28A through 29B.

The above-mentioned applications of the prism unit shown in FIGS. 31A and 31B provides a decentralized control type optical Banyan network. Alternatively, it is possible to provide a centralized control non-blocking self-routing by adjusting the ON/OFF state of each polarization controller beforehand.

A polarization control crossconnect self-routing algorithm of an eight-input four-stage non-blocking optical Banyan network is adjusted as follows. It is assumed that the input light has the horizontal (P) polarization and each node is given the number of the desirable destination node in binary notation.

The first step of the algorithm is to perform the setting of each polarization switch node at the first stage. More specifically, the first step calculates a first exclusive-OR operation on the first bit of each binary-valued node number from the left side thereof and the first bit of each binary-valued destination node number from the left side thereof. Then, the first step calculates a second exclusive-OR operation on the result of the first exclusive-OR operation and 1. The ON/OFF setting to each of the polarization controllers of the two-dimensional polarization controller array is determined in accordance with the results of the second exclusive-OR operation.

The second step of the algorithm carries out the setting of each polarization switch node at the second stage. When the incident light has the horizontal (P) polarization, the second step calculates an exclusive-OR operation on the second bit of each node number obtained at the second node and 1. The ON/OFF state of each polarization controller at the second stage is determined in accurdance with the results of the above exclusive-OR operation. When the incident light has the vertical (S) polarization, the ON/OFF state of each polarization controller is determined in accordance with the second bit of each node number obtained at the second stage.

The third step of the algorithm sets the state of each polarization switch node a the third stage. When the incident light has the horizontal polarization, the third step calculates an exclusive-OR operation on the second bit of each node number obtained at the third stage and the second bit of each destination node related to a route which reaches each node. The ON/OFF state of each polarization controller is determined in accordance with the results of the above exclusive-OR operation. On the other hand, when the incident light has the vertical polarization, the ON/OFF state of each polarization controller is determined in accordance with the results of an exclusive-OR operation on the second bit of each node number obtained at the third stage and 1.

The fourth step of the algorithm sets the state of each polarization switch node at the fourth stage. When the incident light has the horizontal polarization, the fourth step calculates an exclusive-OR operation on the third bit of each node number obtained at the fourth stage and the third bit of each destination node related to a route which reaches said node. The ON/OFF state of each polarization controller is determined in accordance with the results of the above exclusive-OR operation. On the other hand, when the incident light has the vertical polarization, the ON/OFF state of each polarization controller is determined in accordance with the results of an exclusive-OR operation on the third bit of each node number obtained at the fourth stage and 1. The above-mentioned algorithm is suitable for application of a low-speed switch in a large-capacity data transmission of moving images in multiple channels.

Figure 32:
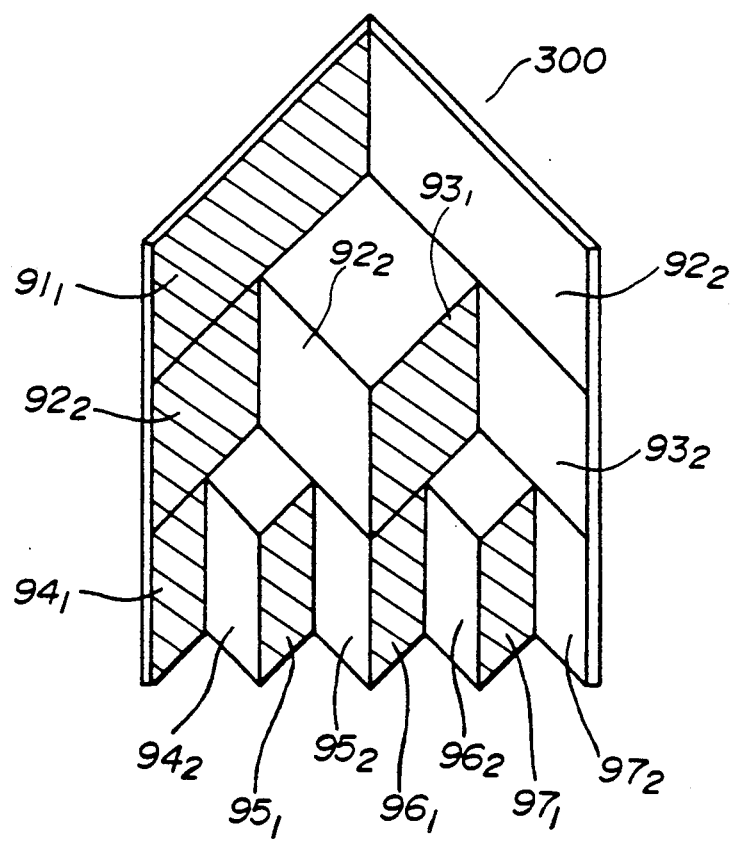
FIG. 32 is a perspective view of a mirror unit which realizes a three-stage crossover network based on the seventh embodiment of the present invention.

A description will now be given of the implementation of a crossover network using the circularly connected type optical space switch according to the present invention. Referring to FIG. 32, there is illustrated a mirror unit 300, which has first through fourth stages. The first stage has a pair of two mirrors $91_1$ and $91_2$, and the second stage has a pair of mirrors $92_1$ and $92_2$ and a pair of mirrors $93_1$ and $93_2$. The third stage has a pair of mirrors $94_1$ and $94_2$, a pair of mirrors $95_1$ and $95_2$, a pair of mirrors $96_1$ and $96_2$, and a pair of mirrors $97_1$ and $97_2$.

The two mirrors of each pair are arranged so that they are orthogonal to each other. Each of the mirrors $92_1$, $92_2$, $93_1$ and $93_2$ of the second stage has a size half that of the mirrors $91_1$ and $91_2$ of the first stage. Each of the mirrors $94_1$, $94_2$, $95_1$, $95_2$, $96_1$, $96_2$, $97_1$ and $97_2$ of the third stage has a size half that of each mirror of the second stage. The first stage has a largest horizontal (horizontal) distance between the input and output paths. The second stage has a horizontal distance half that of the first stage, and the third stage has a horizontal distance which is a quarter of that of the first stage.

By forming the light path changing elements 67 and 67' of the arrangements shown in FIGS. 24A, 24B, 27, 29A and 29B of the mirror unit 300 shown in FIG. 32, it is possible to provide crossover networks. It is alternatively possible to replace the mirror unit 300 by pairs of total reflection prisms.

The light path changing elements 67 and 67' are not limited to the specifically disclosed elements, but other prisms and holograms having the same function can be used.

The Banyan networks and crossover networks according to the present invention provide isomolphic multiple input beam interconnection means.

The present invention is not limited to the specifically disclosed embodiments and variations and modifications may be made without departing from the scope of the present invention.

What is claimed is:

1. An optical space switch comprising:
   polarization control means having first and second modes, for receiving input light and outputting said input light so that a polarization of said input light is maintained in the first mode and is substantially changed by 90° in the second mode;
   polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said polarization control means being positioned on a first side of said polarization beam splitter means;
   first reflection means, positioned on a second side of said polarization beam splitter means, for reflecting one of said first light and said second light so that a light path of said one of said first light and said second light is shifted in a plane and the polarization of said one of said first light and said second light is substantially changed by 90° and for outputting a first reflected light; and
   second reflection means, positioned on a third side of said polarization beam splitter means, for reflecting said first reflected light supplied from said first reflection means via said polarization beam splitter means so that a polarization of said first reflected light is substantially changed by 90° and for outputting a second reflected light;
   wherein:
   the other one of said first light and said second light enters said polarization beam splitter means and is output, as a first light output, from a fourth side of said polarization beam splitter means;
   said second reflected light from said second reflection means enters said polarization beam splitter means and is output, as a second light output, from the fourth side of said polarization beam splitter means; and
   said first light output has a light path which is different from that of said second light output.

2. An optical space switch as claimed in claim 1, wherein said first reflection means comprises:
   a quarter wave plate arranged perpendicular to said one of said first light and said second light so that an optical axis of said quarter wave plate is included at approximately 45° with respect to the direction of the polarization of said one of said first light and said second light; and
   a light path changing element which shifts said one of said first light and said second light from said quarter wave plate in a predetermined direction including said plane by a predetermined distance.

3. An optical space switch as claimed in claim 2, wherein said light path changing element comprises:
   a prism having a cross-sectional portion having an isosceles triangle shape; and
   a reflection mirror facing said prism.

4. An optical space switch as claimed in claim 3, wherein said prism comprises:
   a triangle-shaped portion having said cross-sectional portion having the isosceles triangle shape; and
   a rectangular parallelepiped portion integrally formed with said triangle-shaped portion.

5. An optical space switch as claimed in claim 2, wherein:
   said light path changing element comprises a prism having a cross section consisting of a first cross-sectional portion having an isosceles triangle shape and a second cross-selection portion having a rectangular shape; and
   said prism has a surface on which a reflection coating layer is formed.

6. An optical space switch as claimed in claim 2, wherein:
   said light path changing element comprises a transparent graded index element having a one-dimensional symmetry distribution of refractive index in said predetermined direction in which said one of said first light and said second light is shifted; and said transparent graded index element has a surface on which a reflection coating layer is formed.

7. An optical space switch as claimed in claim 2, wherein said light path changing element comprises:
   a diffraction grating; and
   a reflection mirror facing said diffraction grating.

8. An optical space switch as claimed in claim 1, wherein said second reflection means comprises:
   a quarter wave plate arranged perpendicular to said first reflected light so that an optical axis of said quarter wave plate is inclined at approximately 45° with respect to the direction of polarization of said first reflected light; and
   a reflection mirror which reflects said first reflected light from said quarter wave plate.

9. An optical space switch as claimed in claim 1, wherein:
   said first side of said polarization beam splitter means and said fourth side thereof are opposite to each other; and
   said second side of said polarization beam splitter means and said third side thereof are opposite to each other.

10. An optical space switch as claimed in claim 1, wherein:
    said first side of said polarization beam splitter means and said second side thereof are opposite to each other; and
    said third side of said polarization beam splitter means and said fourth side thereof are opposite to each other.

11. An optical space switch as claimed in claim 1, wherein:
    said first side of said polarization beam splitter means and said third side thereof are opposite to each other; and
    said second side of said polarization beam splitter means and said fourth side thereof are opposite to each other.

12. An optical space switch as claimed in claim 1, wherein:
    said polarization control means comprises an array composed of a plurality of polarization controllers; and
    said input light comprises a plurality of light inputs respectively related to said plurality of polarization controllers.

13. An optical space switch as claimed in claim 12, wherein said plurality of polarization controllers are arranged in a line.

14. An optical space switch as claimed in claim 12, wherein said plurality of polarization controllers are arranged into rows and columns.

15. An optical space switch as claimed in claim 12, wherein said first reflection means comprises:
    a quarter wave plate arranged perpendicular to said one of said first light and said second light so that an optical axis of said quarter wave plate is inclined at approximately 45° with respect to the direction of the polarization of said one of said first light and said second light;
    a light path changing member having a plurality of prism portions arranged side by side, each of said plurality of prism portions having a cross-sectional portion having an isosceles triangle shape; and
    a reflection mirror facing said light path changing member.

16. An optical space switch as claimed in claim 12, wherein said first reflection means comprises:
    a quarter wave plate arranged perpendicular to said one of said first light and said second light so that an optical axis of said quarter wave plate is inclined at approximately 45° with respect to the direction of the polarization of said one of said first light and said second light;
    a prism having a single prism portion having a cross section having an isosceles triangle shape; and
    a reflection mirror facing said prism.

17. An optical space switch as claimed in claim 1, wherein said polarization control means comprises a transparent type polarization controller which passes said input light so that the polarization of said input light is maintained in the first mode and is substantially changed by 90° in the second mode.

18. An optical space switch as claimed in claim 1, wherein said polarization control means comprises a reflection type polarization controller which reflects said input light so that the polarization of said input light is maintained in the first mode and is substantially changed by 90° in the second mode.

19. An optical space switch comprising:
    polarization control means having first and second modes, for receiving input light and outputting said input light so that a polarization of said input light is maintained in the first mode and is substantially changed by 90° in the second mode;
    first polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said polarization control means being positioned on a first side of said first polarization beam splitter means;
    first reflection means, positioned on a second side of said first polarization beam splitter means, for reflecting one of said first light and said second light to thereby output a first reflected light;
    light path changing means for shifting a light path of said first reflected light in a plane;
    second reflection means for reflecting one of said first reflected light output from said light path changing means and said input light output via a third side of said first polarization beam splitter means to thereby output a second reflected light; and
    second polarization beam splitter means for passing one of said first reflected light from said light path changing means and said second reflected light and for reflecting the other one of said first reflected light from said light path changing means and said second reflected light,
    wherein:
    said one of said first reflected light from said light path changing means and said second reflected light is a first light output having a light path; and
    the other one of said first reflected light from said light path changing means and said second reflected light is a second light output having a light path different from that of said first light output.

20. An optical space switch as claimed in claim 19, wherein said light path changing means comprises:

a first prism having a cross-sectional portion of an isosceles triangle shape; and a second prism having a cross-sectional portion of an isosceles triangle shape, said first prism facing said second prism.

21. An optical space switch as claimed in claim 19, wherein:

said light path changing means comprises a prism having a first isosceles triangle shaped member, a second isosceles triangle shaped member, and a rectangular parallelepiped having two opposite surfaces on which said first isosceles triangle shaped member and said second isosceles triangle shaped member are respectively mounted; and said first isosceles triangle shaped member, said second isosceles triangle shaped member and said rectangular parallelepiped are integrally formed.

22. An optical space switch as claimed in claim 19, wherein said light path changing means comprises a transparent graded index element having a one-dimensional symmetry distribution of a refractive index in a direction in which said first reflected light is shifted.

23. An optical space switch as claimed in claim 19, wherein said light path changing element comprises:

a first diffraction grating; and a second diffraction grating facing said first diffraction grating.

24. An optical space switch as claimed in claim 19, wherein:

said polarization control means comprises an array composed of a plurality of polarization controllers; and said input light comprises a plurality of light inputs respectively related to said plurality of polarization controllers.

25. An optical space switch as claimed in claim 24, wherein said plurality of polarization controllers are arranged in a line.

26. An optical space switch as claimed in claim 24, wherein said plurality of polarization controllers are arranged into rows and columns.

27. An optical space switch as claimed in claim 19, wherein said second reflection means is positioned so that said first reflection means, said light path changing means and said second reflection means are arranged in a line.

28. An optical space switch as claimed in claim 19, wherein said second polarization beam splitter means is positioned so that said first reflection means, said light path changing means and said second polarization beam splitter means are arranged in a line.

29. An optical space switch comprising:

a first one-dimensional optical space switch which switches light paths in a first plane; and a second one-dimensional optical switch which switches light paths in a second plane, and wherein each of said first and second one-dimensional optical space switch comprises:

polarization control means having first and second modes, for receiving input light and outputting said input light so that a polarization of said input light is maintained in the first mode and is substantially changed by 90° in the second mode;

polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said polarization control means being positioned on a first side of said polarization beam splitter means;

first reflection means, positioned on a second side of said polarization beam splitter means, for a reflecting one of said first light and second light so that a light path of said one of said first light and said second light is shifted in a corresponding one of said first and second planes and the polarization of said one of said first light and said second light is substantially changed by 90° and for outputting a first reflected light; and second reflection means, positioned on a third side of said polarization beam splitter means, for reflecting said first reflected light supplied from said first reflection means via said polarization beam splitter means so that a polarization of said first reflected light is substantially changed by 90° and for outputting a second reflected light;

wherein:

the other one of said first light and said second light enters said polarization beam splitter means and is output, as a first light output, from a fourth side of said polarization beam splitter means;

said second reflected light from said second reflection means enters said polarization beam splitter means and is output, as a second light output, from the fourth side of said polarization beam splitter means;

said first light output has a light path which is different from that of said second light output; and said first light output and said second light output related to said first one-dimensional optical space switch are applied, as said input light, to said second one-dimensional optical space switch.

30. An optical space switch as claimed in claim 29, wherein:

said polarization control means of each of said first and second one-dimensional optical space switches comprises an array composed of polarization controllers arranged in rows and columns, wherein first reflection means of each of said first and second one-dimensional optical space switches comprises:

a quarter wave plate arranged perpendicular to said one of said first light and said second light so that an optical axis of said quarter wave plate is inclined at approximately 45° with respect to the direction of the polarization of said one of said first light and said second light; and a light path changing element which shifts said one of said first light and said second light from said quarter wave plate in said corresponding one of said first and second planes by a predetermined distance.

31. An optical space switch comprising:

a first one dimensional optical space switch which switches light paths in a first plane; and a second one-dimensional optical switch which switches light paths in a second plane, and wherein each of said first and second one-dimensional optical space switch comprises:

polarization control means having first and second modes, for receiving input light and outputting said input light so that a polarization of said input light is maintained in the first mode and is substantially changed by 90° in the second mode;

first polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said polarization control means being positioned on a first side of said first polarization beam splitter means;

first reflection means, positioned on a second side of said first polarization beam splitter means, for reflecting one of said first light and said second light to thereby output a first reflected light;

light path changing means for shifting a light path of said first reflected light in a corresponding one of said first and second planes;

second reflection means for reflecting one of said first reflected light output form said light path changing means and said input light output via a third side of said first polarization beam splitter means to thereby output a second reflected light; and second polarization beam splitter means for passing one of said first reflected light from said light path changing means and said second reflected light and for reflecting the other one of said first reflected light from said light path changing means and said second reflected light;

wherein:

said one of said first reflected light from said light path changing means and said second reflected light is a first light output having a light path;

the other one of said first reflected light from said light path changing means and said second reflected light is a second light output having a light path different from that of said first light output; and said first light output and said second light output related to said first one-dimensional optical space switch are applied, as said input light, to said second one-dimensional optical space switch.

32. An optical network comprising:

n optical space switches which are cascaded, where n is an integer equal to or larger than 2;

each of said n optical space switches comprising:

polarization control means having first and second modes, for receiving input light and outputting said input light so that a polarization of said input light is maintained in the first mode and is substantially changed by 90° in the second mode, said polarization control means comprising an array of a plurality of polarization controllers arranged into a line, said input light having a plurality of light inputs respectively related to said polarization controllers;

polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said polarization control means being positioned on a first side of said polarization beam splitter means;

first reflection means, positioned on a second side of said polarization beam splitter means, for reflecting one of said first light and said second light so that a light path of said one of said first light and said second light is shifted in a plane and the polarization of said one of said first light and said second light is substantially changed by 90° and for outputting a first reflected light; and second reflection means, positioned on a third side of said polarization beam splitter means, for reflecting said first reflected light supplied from said first reflection means via said polarization beam splitter means so that a polarization of said first reflected light is substantially changed by 90° and for outputting a second reflected light;

wherein:

the other one of said first light and second light enters said polarization beam splitter means and is output, as a first light output, from a fourth side of said polarization beam splitter means;

said second reflected light from said second reflection means enters said polarization beam splitter means and is output, as a second light output, from the fourth side of said polarization beam splitter means;

said first light output has a light path which is different from that of said second light output; and said first light output and said second light output related to an i-th optical space switch ($i=2, 3, \ldots, n$) are supplied, as said input light, to said $(i+1)$th optical space switch.

33. An optical network as claimed in claim 32, wherein:

said plurality of light inputs comprises $2^n$ light inputs:

said first reflection means comprises a quarter wave plate arranged perpendicular to said one of said first light and said second light so that an optical axis of said quarter wave plate is inclined at approximately 45° with respect to the direction of polarization of said one of said first light and said second light, and a light path changing element which shifts said one of said first light and said second light from said quarter wave plate in a predetermined direction including said plane by a predetermined distance;

said light path changing means of the i-th optical space switch comprises an array of $2^{i-1}$ light path changing elements arranged in a line;

$2^{n-i+1}$ light inputs among said $2^n$ light inputs are applied to each of said $2^{i-1}$ light path changing elements of the i-th optical space switch; and each of said $2^{i-1}$ light path changing elements switches light paths which are spaced apart from each other by a factor of $2^{n-1}$.

34. An optical network as claimed in claim 33, wherein said light path changing means of the i-th optical space switch comprises a prism having said array composed of the $2^{i-1}$ light path changing elements.

35. An optical network as claimed in claim 33, wherein said optical network is an optical Banyan network.

36. An optical space switch comprising:

polarization control means having first and second modes, for receiving input light and outputting said input light so that a polarization of said input light is maintained in the first mode and is substantially changed by 90° in the second mode, said polarization control means comprising an array composed of a plurality of polarization controllers;

polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said input light from said polarization control means entering said polarization beam splitter means via a first side thereof;

first reflection means, positioned on a second side of said polarization beam splitter means, for reflecting one of said first light and said second light so that a light path of said one of said first light and said second light is shifted in a first plane and the polarization of said one of said first light and said second light is substantially changed by 90° and for outputting a first reflected light; and second reflection means, positioned on a third side of said polarization beam splitter means, for reflecting said first reflected light supplied from said first reflection means via said polarization beam splitter means so that a polarization of said first reflected light is substantially changed by 90° and for outputting a second reflected light;

wherein:

the other one of said first light and said second light enters said polarization beam splitter means and is output, as a first light output, from a fourth side of said polarization beam splitter means, said second reflected light from said second reflection means enters said polarization beam splitter means and is output, as a second light output, from the fourth side of said polarization beam splitter means; and said first light output has a light path which is different from that of said second light output, and wherein said optical space switch further comprises light circulating means for circulating said first and second light outputs with respect to said input light so that said first and second light outputs are repeatedly input to said polarization beam splitter means via said polarization control means and light paths of said first and second light outputs are shifted in a predetermined direction and for finally outputting said first and second light outputs in a second plane in which said input light is included.

37. An optical space switch as claimed in claim 36, wherein said light circulating means comprises first, second, third and fourth reflection elements which are arranged so that said first and second light outputs are circulated via said polarization control means and said polarization beam splitter means.

38. An optical space switch as claimed in claim 37, wherein said polarization control means is interposed between said first reflection element positioned on said first side of said polarization beam splitter means and said fourth reflection element.

39. An optical space switch as claimed in claim 37, wherein said polarization control means is interposed between said first reflection element positioned on said first side of said polarization beam splitter means and said polarization beam splitter means.

40. An optical space switch as claimed in claim 36, wherein said first reflection means comprises:

a quarter wave plate arranged perpendicular to said one of said light and said second light so that an optical axis of said quarter wave plate is inclined at approximately 45° with respect to the direction of the polarization of said one of said first light and said second light; and a light path changing element which shifts said one of said first light and said second light from said quarter wave plate in a predetermined direction including said plane by a predetermined distance.

41. An optical space switch as claimed in claim 40, wherein:

said light path changing element comprises a prism unit which has first, second and third stages arranged in a first direction;

said first stage has a first prism having a first size and a first cross section of a first isosceles triangle shape;

said second stage has a second prism and a third prism arranged side by side in a second direction perpendicular to said first direction, each of said first prism and said second prism having a second cross section with a second isosceles triangle shape having a second size half that of said first prism;

said third stage has a fourth prism, a fifth prism, a sixth prism and a seventh prism which are arranged side by side in said second direction, each of said fourth, fifth, sixth and seventh prisms having a third cross section with a third isosceles triangle shape having a third size half that of each of said second and third prisms;

said first through seventh prisms have one of respective surfaces arranged on an identical plane; and said prism unit has a reflection coating layer provided on the one of said respective surfaces of said first through seventh prisms, so that said optical space switch functions as an optical Banyan network.

42. An optical space switch as claimed in claim 41, wherein said one of said first light and said second light passes through one of said first, second and third stages in a predetermined order each time said input light is circulated.

43. An optical space switch as claimed in claim 40, wherein:

said light path changing element comprises a prism unit which has first, second, third and fourth stages arranged in a first direction;

said first stage has a first prism having a first size and a first cross section of a first isosceles triangle shape;

said second stage has a second prism and a third prism arranged side by side in a second direction perpendicular to said first direction, each of said second prism and said third prism having a second cross section with a second isosceles triangle shape having a second size half that of said first prism;

said third stage has a fourth prism and a fifth prism which are arranged side by side in said second direction, each of said fourth and fifth prisms having the second size;

said fourth stage has a sixth prism, a seventh prism, an eight prism and a ninth prism which are arranged side by side in said second direction, each of said sixth through ninth prisms having a third cross section with a third isosceles triangle shape having a third size half that of each of said second through fifth prisms;

said first through ninth prisms having one of respective surfaces arranged on an identical plane; and said prism unit has a reflection coating layer provided on the one of said respective surfaces of said first through ninth prisms, so that said optical space switch functions as a non-blocking optical Banyan network.

44. An optical space switch as claimed in claim 40, wherein:
said light path changing element comprises a mirror unit which has first, second and third stages arranged in a first direction;
said first stage has a pair of mirror surfaces having a first size, arranged perpendicular to each other;
said second stage has two pairs of mirror surfaces arranged side by side in a second direction perpendicular to said first direction, each of said two pairs of mirror surfaces being arranged perpendicular to each other, and each of said mirror surfaces of said two pairs having a second size half that of each of said pair of mirror surfaces of said first stage;
said third stage has four pairs of mirror surfaces arranged side by side in said second direction, each of said four pairs of mirror surfaces being arranged perpendicular to each other, and each of said mirror surfaces of said four pairs having a third size half that of each of said two parts of mirror surfaces of said a second stage, so that said optical space switch functions as an optical crossover switch.

45. An optical space switch as claimed in claim 36, wherein said second reflection means comprises:
a quarter wave plate arranged perpendicular to said first reflected light so that an optical axis of said quarter wave plate is inclined at approximately 45° with respect to the direction of the polarization of said first reflected light; and
a reflection mirror which reflects said first reflected light from said quarter wave plate.

46. An optical space switch comprising:
a first one-dimensional circularly connected type optical space switch in which light is shifted in a first plane;
a second one-dimensional circularly connected type optical space switch in which light is shifted in a second plane perpendicular to said first plane; and
coupling means for optically coupling said first and second one-dimensional circularly connected type optical space switches with each other,
wherein each of said first and second one-dimensional optical space switches comprises:
polarization control means having first and second modes, for receiving input light and outputting said input light so that a polarization of said input light is maintained in the first mode and is substantially changed by 90° in the second mode, said polarization control means comprising an array composed of a plurality of polarization controllers;
polarization beam splitter means for passing said input light from said polarization control means when said input light has a first polarization to thereby output a first light and for reflecting said input light from said polarization control means when said input light has a second polarization substantially perpendicular to said first polarization to thereby output a second light, said input light from said polarization control means entering said polarization beam splitter means via a first side thereof;
first reflection means, positioned on a second side of said polarization beam splitter means, for reflecting one of said first light and said second light so that a light path of said one of said first light and said second light is shifted and the polarization of said one of said first light and said second light is substantially changed by 90° and for outputting a first reflected light; and
second reflection means, positioned on a third side of said polarization beam splitter means, for reflecting said first reflected light supplied from said first reflection means via said polarization beam splitter means so that a polarization of said first reflected light is substantially changed by 90° and for outputting a second reflected light;
wherein:
the other one of said first light and said second light enters said polarization beam splitter means and is output, as a first light output, from a fourth side of said polarization beam splitter means;
said second reflected light from said second reflection means enters said polarization beam splitter means and is output, as a second light output, from the fourth side of said polarization beam splitter means; and
said first light output has a light path which is different from that of said second light output,
said optical space switch further comprises light circulating means for circulating said first and second light outputs with respect to said input light so that said first and second light outputs are repeatedly input to said polarization beam splitter means via said polarization control means and light paths of said first and second light outputs are shifted in a predetermined direction and for finally outputting said first and second light outputs in a corresponding one of said first and second planes in which said input light is included; and
said first and second light outputs related to said first one-dimensional circularly connected type optical space switch pass through said coupler and are input, as said input light, to said second one-dimensional circularly connected type optical space switch.

47. An optical space switch as claimed in claim 46, wherein said light circulating means of each of said first and second one-dimensional circularly connected type optical space switches comprises first, second, third and fourth reflection elements which are arranged so that said first and second light outputs are circulated via said polarization control means and said polarization beam splitter means.

48. An optical space switch as claimed in claim 46, wherein said first reflection means of each of said first and second one-dimensional circularly connected type optical space switches comprises:
a quarter wave plate arranged perpendicular to said one of said first light and said second light so that an optical axis of said quarter wave plate is inclined at approximately 45° with respect to the direction of the polarization of said one of said first light and said second light; and
a light path changing element which shifts said one of said first light and said second light from said quarter wave plate in a predetermined direction including said plane by a predetermined distance.

49. An optical space switch as claimed in claim 48, wherein:
said light path changing element of each of said first and second one-dimensional circularly connected type optical space switches comprises a prism unit which has first, second and third stages arranged in a first direction;

said first stage has a first prism having a first size and a first cross section with a first isosceles triangle shape;

said second stage has a second prism and a third prism arranged side by side in a second direction perpendicular to said first direction, each of said first prism and said second prism having a second cross section with a second isosceles triangle shape having a second size half that of said first prism;

said third stage has a fourth prism, a fifth prism, a sixth prism and a seventh prism which are arranged side by side in said second direction, each of said fourth, fifth, sixth and seventh prisms having a third cross section with a third isosceles triangle shape having a third size half that of each of said second and third prisms;

said first through seventh prisms have one of respective surfaces arranged on an identical plane; and said prism unit has a reflection coating layer provided on the one of said respective surfaces of said first through seventh prisms, so that said optical space switch functions as a two-dimensional optical Banyan network.

50. An optical space switch as claimed in claim 49, wherein said one of said first light and said second light passes through one of said first, second and third stages in a predetermined order each time said input light is circulated.

51. An optical space switch as claimed in claim 48, wherein:

said light path changing element of each of said first and second one-dimensional circularly connected type optical space switches comprises a prism unit which has first, second, third and fourth stages arranged in a first direction;

said first stage has a first prism having a first size and a first cross section having a first isosceles triangle shape;

said second stage has a second prism and a third prism arranged side by side in a second direction perpendicular to said first direction, each of said second prism and said third prism having a second cross section with a second isosceles triangle shape having a second size half that of said first prism;

said third stage has a fourth prism and a fifth prism which are arranged side by side in said second direction, each of said fourth and fifth prisms having the second size;

said fourth stage has a sixth prism, a seventh prism, an eight prism and a ninth prism which are arranged side by side in said second direction, each of said sixth through ninth prisms having a third cross section of a third isosceles triangle having a third size half that of each of said second through fifth prisms;

said first through ninth prisms have one of respective surfaces arranged on an identical plane; and said prism unit has a reflection coating layer provided on said one of respective surfaces of said first through ninth prisms, so that said optical space switch functions as a two-dimensional optical Banyan network.

52. An optical space switch as claimed in claim 48, wherein:

said light path changing element of each of said first and second one-dimensional circularly connected type optical space switches comprises a mirror unit which has first, second and third stages arranged in a first direction;

said first stage has a pair or mirror surfaces having a first size, arranged perpendicular to each other;

said second stage has two pairs of mirror surfaces arranged side by side in a second direction perpendicular to said first direction, each of said two pairs of mirror surfaces being arranged perpendicular to each other, and each of said mirror surfaces of said two pairs having a second size half that of each of said pair of mirror surfaces of said first stage;

said third stage has four pairs of mirror surfaces arranged side by side in said second direction, each of said four pairs of mirror surfaces being arranged perpendicular to each other, and each of said mirror surfaces of said four pairs having a third size half that of each of said two pairs of mirror surfaces of said second stage, so that said optical space switch functions as a two-dimensional optical crossover switch.

53. An optical space switch as claimed in claim 46, wherein said second reflection means of each of said first and second one-dimensional circularly connected type optical space switches comprises:

a quarter wave plate arranged perpendicular to said first reflected light so that an optical axis of said quarter wave plate is inclined at approximately 45° with respect to the direction of the polarization of said first reflected light; and a reflection mirror which reflects said first reflected light from said quarter wave plate.

* * * * *